United States Patent
Holzmueller et al.

(10) Patent No.: US 11,646,134 B2
(45) Date of Patent: May 9, 2023

(54) ARMORED SUBMERSIBLE POWER CABLE

(71) Applicant: SCHLUMBERGER TECHNOLOGY CORPORATION, Sugar Land, TX (US)

(72) Inventors: Jason Holzmueller, Lawrence, KS (US); Jinglei Xiang, Lawrence, KS (US); Samy A. Madbouly, Katy, TX (US); William Goertzen, Lawrence, KS (US); Varun Vinaykumar Nyayadhish, Lawrence, KS (US); Gregory Howard Manke, Overland Park, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/320,731

(22) PCT Filed: Jun. 28, 2017

(86) PCT No.: PCT/US2017/039632
§ 371 (c)(1),
(2) Date: Jan. 25, 2019

(87) PCT Pub. No.: WO2018/022237
PCT Pub. Date: Feb. 1, 2018

(65) Prior Publication Data
US 2019/0164670 A1  May 30, 2019

Related U.S. Application Data

(60) Provisional application No. 62/367,455, filed on Jul. 27, 2016, provisional application No. 62/369,166, filed on Jul. 31, 2016.

(51) Int. Cl.
*H01B 9/02* (2006.01)
*H01B 13/14* (2006.01)
(Continued)

(52) U.S. Cl.
CPC ........... *H01B 13/14* (2013.01); *B29C 48/154* (2019.02); *C08K 3/013* (2018.01); *C08K 3/346* (2013.01);
(Continued)

(58) Field of Classification Search
CPC ....................................... H01B 9/027
(Continued)

(56) References Cited

U.S. PATENT DOCUMENTS 1,993,526 A * 3/1935 Rihl ......................... H01B 7/14
174/106 R
3,719,769 A * 3/1973 Miyauchi ............... H01B 3/004
174/120 SC
(Continued)

FOREIGN PATENT DOCUMENTS

CN  202394580  *  8/2012
RU  149728 U1  1/2015
(Continued)

OTHER PUBLICATIONS

ASTM D150, "Standard Test Method for Density of Plastics by the Density-Gradient Technique", 2018, 7 pages.
(Continued)

*Primary Examiner* — Chau N Nguyen
(74) *Attorney, Agent, or Firm* — Matthew Goode

(57) ABSTRACT

A method can include extruding polyethylene about a lead (Pb) barrier layer disposed about a conductor to form an assembly; and armoring at least one of the assemblies with metallic armor to form a cable. A power cable can include a conductor; a lead (Pb) barrier layer disposed about the conductor; a cushion layer disposed about the lead (Pb) barrier layer where the cushion layer includes crosslinked polyethylene (XLPE); and metallic armor wrapped about the cushion layer.

12 Claims, 25 Drawing Sheets

(51) Int. Cl.
    *H01B 3/02*     (2006.01)
    *H01B 7/04*     (2006.01)
    *H01B 3/44*     (2006.01)
    *C08K 3/013*     (2018.01)
    *B29C 48/154*     (2019.01)
    *C08K 3/34*     (2006.01)
    *E21B 17/20*     (2006.01)
    *E21B 43/12*     (2006.01)

(52) U.S. Cl.
CPC .......... *E21B 17/206* (2013.01); *E21B 43/128* (2013.01); *H01B 3/02* (2013.01); *H01B 3/441* (2013.01); *H01B 7/046* (2013.01)

(58) Field of Classification Search
USPC ...................................... 174/102 SC, 120 SC
See application file for complete search history.

(56) References Cited

U.S. PATENT DOCUMENTS

| | | | | |
|---|---|---|---|---|
| 4,780,574 | A * | 10/1988 | Neuroth | H01B 7/046 156/52 |
| 5,410,106 | A | 4/1995 | Nishino et al. | |
| 5,837,939 | A * | 11/1998 | Cieloszyk | H01B 3/441 174/110 PM |
| 6,260,615 | B1 * | 7/2001 | Dalrymple | E21B 36/04 166/302 |
| 8,993,889 | B2 | 3/2015 | Barbera | H01B 7/18 174/102 R |
| 2004/0020681 | A1 * | 2/2004 | Hjortstam | B82Y 30/00 174/102 SC |
| 2005/0049343 | A1 * | 3/2005 | Borke | C08L 23/0892 524/502 |
| 2006/0102376 | A1 * | 5/2006 | Kuchita | H01B 3/446 174/102 SC |
| 2010/0186990 | A1 * | 7/2010 | Neuroth | H01B 7/045 174/120 AR |
| 2011/0018476 | A1 * | 1/2011 | Oriet | H01M 2/206 318/139 |
| 2012/0121224 | A1 | 5/2012 | Dalrymple et al. | |
| 2012/0168199 | A1 * | 7/2012 | McCullough | H01B 3/427 977/932 |
| 2013/0153260 | A1 * | 6/2013 | Favereau | H01B 7/18 174/102 C |
| 2014/0027152 | A1 | 1/2014 | Holzmueller et al. | |
| 2015/0184790 | A1 * | 7/2015 | Baker | F16L 59/12 137/377 |
| 2015/0228376 | A1 | 8/2015 | Ranganathan et al. | |
| 2016/0141070 | A1 | 5/2016 | Heipel et al. | |
| 2016/0152807 | A1 * | 6/2016 | Chaudhary | C08L 23/0815 428/375 |

FOREIGN PATENT DOCUMENTS

| | | |
|---|---|---|
| RU | 2540268 C2 | 2/2015 |
| WO | 2016066620 A1 | 5/2016 |
| WO | 2016089619 A1 | 6/2016 |

OTHER PUBLICATIONS

International Search Report and Written Opinion of PCT Application No. PCT/US2017/039632 dated Oct. 11, 2017, 13 pages.
ASTM D1418, "Standard Practice for Rubber and Rubber Latices—Nombeclature" (2017) 3 pages.
International Preliminary Report on Patentability of PCT Application No. PCT/US2017/039632 dated Jan. 29, 2019, 9 pages.
Office Action issued in the RU Application 2019105297, dated Sep. 25, 2020 (12 pages).
Office Action issued in the CO Application NC2019/0001617, dated Mar. 18, 2021 (25 pages).
Hong, Seong-Gu & Byun, Thak Sang & Snead, L.L & Lee, Chong Soo. (2009). Evaluation Method of the Hoop Strength of Small-Sized Tubular Ceramic Components. Journal of Materials Research—J Mater Res. 24. 1422-1434. 10.1557/jmr.2009.0158. (14 pages).

* cited by examiner

ARMORED SUBMERSIBLE POWER CABLE

RELATED APPLICATIONS

This application claims priority to and the benefit of a US provisional application having Ser. No. 62/369,166, filed 31 Jul. 2016, which is incorporated by reference herein, and claims priority to and the benefit of a US provisional application having Ser. No. 62/367,455, filed 27 Jul. 2016, which is incorporated by reference herein.

BACKGROUND

Equipment used in the oil and gas industry may be exposed to high-temperature and/or high-pressure environments. Such environments may also be chemically harsh, for example, consider environments that may include chemicals such as hydrogen sulfide, carbon dioxide, etc. Such environments can include one or more types of fluids where, for example, equipment may be at least partially submersed in the one or more types of fluids. Various types of environmental conditions can damage equipment.

SUMMARY

A method can include extruding polyethylene about a lead (Pb) barrier layer disposed about a conductor to form an assembly; and armoring at least one of the assemblies with metallic armor to form a cable. A power cable can include a conductor; a lead (Pb) barrier layer disposed about the conductor; a cushion layer disposed about the lead (Pb) barrier layer where the cushion layer includes crosslinked polyethylene (XLPE); and metallic armor wrapped about the cushion layer. A pump system can include a pump; a submersible electric motor operatively coupled to the pump; and a power cable for delivery of electrical power to the submersible electric motor, where the power cable includes a conductor, a lead (Pb) barrier layer disposed about the conductor, a cushion layer disposed about the lead (Pb) barrier layer where the cushion layer includes crosslinked polyethylene (XLPE), and metallic armor wrapped about the cushion layer. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
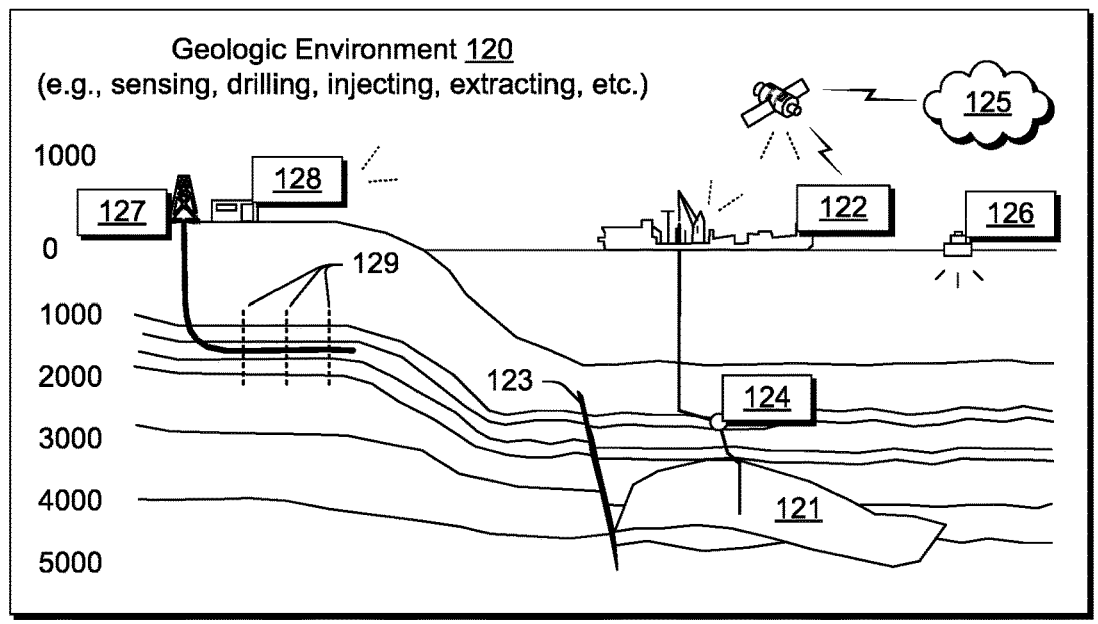
FIG. 1 illustrates examples of equipment in geologic environments.
Figure 1:
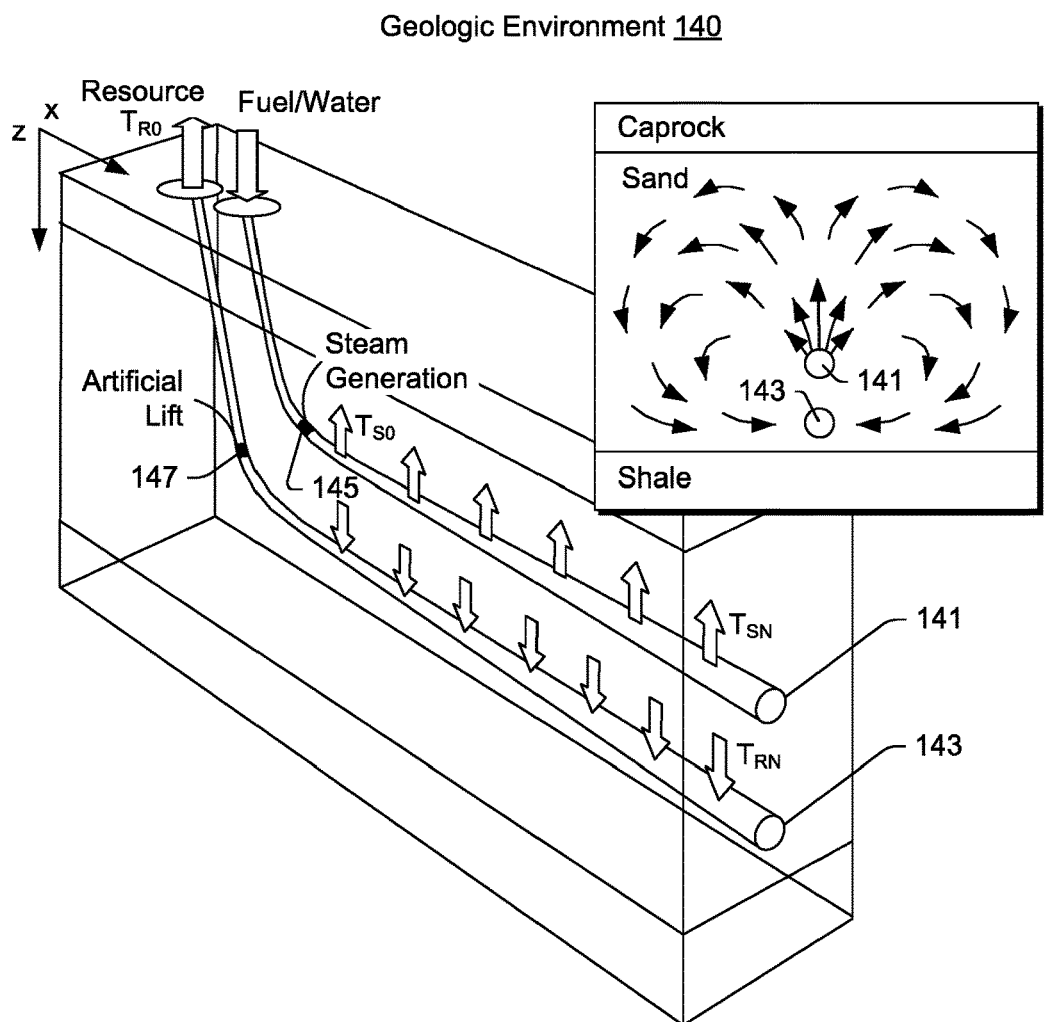

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

In various types of wells, well operations, etc., an electric submersible pump (ESP) power cables and motor lead extensions (MLEs) may be exposed to high temperatures and/or high concentration of corrosive and sour gases and fluids. To protect one or more electrically insulated copper conductors, metallic lead (Pb) sheaths can be employed as a barrier layer to block permeation of downhole media. Such a barrier layer may be referred to as a gas barrier layer, as it is intended to be relatively impermeable to gas. In some examples, a lead (Pb) sheath may include relatively small amounts of another material such as, for example, another metal or metals that may form an alloy or alloys. As such sheath can be greater than approximately 90 percent lead (Pb) by weight, it can be referred to as a metallic lead (Pb) sheath, a lead (Pb) sheath, a metallic lead (Pb) barrier layer, lead (Pb) barrier layer, metallic lead (Pb) layer or lead (Pb) layer.

As an example, a power cable for a downhole application may include an extruded continuous metallic lead (Pb) barrier layer that aims to protect materials interiorly disposed thereto from downhole media such as, for example, one or more corrosive gases (e.g., consider $CO_2$ and $H_2S$). Such an extruded lead (Pb) barrier layer tends to be quite effective at inhibiting gas permeation. As an example, a minimum manufacturing wall thickness of the metallic lead (Pb) barrier layer can be specified (e.g., from about 20 mils to about 60 mils or about 0.5 mm to about 1.5 mm) that aims to help ensure effective protection from corrosive gases.

As an example, a cable may include one or more lead (Pb) alloy layers (e.g., including at least lead (Pb) and tin (Sn)) that may act as a barrier or barriers to gas. In such an example, the one or more lead (Pb) alloy layers may be part of a tape or tapes. As an example, a tape can include one or more lead (Pb) alloy layers and adhesive. As an example, a tape may include one or more lead (Pb) alloy layers that may be of a thickness that is less than that of a metallic lead (Pb) barrier layer of a cable (e.g., a comparable cable). Such an approach may reduce cable weight, for example, when compared to cable weight for a cable that includes one or more metallic lead (Pb) layers as gas barrier layer or layers.

While one or more gas barrier layers may aim to be impermeable to gas migration from an exterior region to an interior region, damage may occur to a cable where pressure can build in an interior region that is interior to a gas barrier layer. For example, if one or more decomposition products and/or degradation products within an insulation layer build up in an interior region, a gas barrier layer can rupture. For example, a lead (Pb) based barrier layer (e.g., extruded lead, alloy tape, etc.) may rupture where a peroxide or peroxide associated with radical polymerization generates decomposition products that remain within an insulation layer at the time the lead (Pb) based barrier layer is applied about the insulation layer (e.g., directly or indirectly). Where gas pressure builds in an interior region, that gas pressure can apply force to a gas barrier layer because the gas barrier layer is substantially impermeable to gas. Such force can weaken the gas barrier layer and cause it to rupture. Upon rupture of the gas barrier layer, while gas can flow outwardly, gas can also then flow inwardly to insulation where damage may occur to insulation and/or conductor(s). When a gas barrier layer is ruptured, fluid, whether liquid or gas, may flow inwardly and cause damage or otherwise disrupt function(s) of a power cable.

As an example, a cable that includes an electrical conductor can include insulation that electrically insulates at least a portion of the electrical conductor, for example, along a length of the electrical conductor, which may be in the form of a wire (e.g., solid, stranded, etc.), and can include a gas barrier layer disposed about the insulation layer (e.g., directly or indirectly).

As an example, insulation can include a polymeric material such as, for example, ethylene propylene diene monomer (M-class) rubber (EPDM) as a type of synthetic rubber that is an elastomer where The E refers to ethylene, P to propylene, D to diene and M refers to a classification in ASTM standard D-1418 (e.g., ethylene copolymerized with propylene and a diene or ethylene propylene diene monomer (M-class) rubber). EPDM can be a byproduct of petroleum where EPDM and petroleum are largely composed of non-polar molecules such that they are miscible (e.g., oil may permeate into EPDM and cause it to swell). As such, where well fluid contacts an EPDM insulation layer, damage may occur to the insulation due to swelling of the EPDM (e.g., which may apply pressure that can mechanically damage one or more features of a cable).

Insulation can be formulated as a mixture that may be referred to as a compound. Where EPDM is included as a predominant polymeric material for insulation (e.g., a base polymer), a compound may be referred to as an EPDM compound and a resulting insulation layer may be referred to as an EPDM insulation layer.

As an example, an insulation compound can include a base polymer, one or more fillers, one or more metal oxides, one or more antioxidants, one or more plasticizers, one or more process aids, one or more curatives and one or more other types of materials.

As an example, a cable may be utilized as a power cable and deployment cable for a tool. For example, consider a cable that can be utilized to power and to deploy an electric submersible pump (ESP) in a bore in a geologic environment.

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with one or more of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc.

SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP). As an example, one or more electrical cables may be connected to the equipment 145 and one or more electrical cables may be connected to the equipment 147. For example, as to the equipment 145, a cable may provide power to a heater to generate steam, to a pump to pump water (e.g., for steam generation), to a pump to pump fuel (e.g., to burn to generate steam), etc. As to the equipment 147, for example, a cable may provide power to power a motor, power a sensor (e.g., a gauge), etc.

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 may then assist with lifting the resource in the well 143 to, for example, a surface facility (e.g., via a wellhead, etc.).

As to a downhole steam generator, as an example, it may be fed by three separate streams of natural gas, air and water (e.g., via conduits) where a gas-air mixture is combined first to create a flame and then the water is injected downstream to create steam. In such an example, the water can also serve to cool a burner wall or walls (e.g., by flowing in a passageway or passageways within a wall). As an example, a SAGD operation may result in condensed steam accompanying a resource (e.g., heavy oil) to a well. In such an example, where a production well includes artificial lift equipment such as an ESP, operation of such equipment may be impacted by the presence of condensed steam (e.g., water). Further, as an example, condensed steam may place demands on separation processing where it is desirable to separate one or more components from a hydrocarbon and water mixture.

Each of the geologic environments 120 and 140 of FIG. 1 may include harsh environments therein. For example, a harsh environment may be classified as being a high-pressure and high-temperature environment. A so-called HPHT environment may include pressures up to about 138 MPa (e.g., about 20,000 psi) and temperatures up to about 205 degrees C. (e.g., about 400 degrees F.), a so-called ultra-HPHT environment may include pressures up to about 241 MPa (e.g., about 35,000 psi) and temperatures up to about 260 degrees C. (e.g., about 500 degrees F.) and a so-called HPHT-hc environment may include pressures greater than about 241 MPa (e.g., about 35,000 psi) and temperatures greater than about 260 degrees C. (e.g., about 500 degrees F.). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more).

As an example, an environment may be classified based at least in part on its chemical composition. For example, where an environment includes hydrogen sulfide ($H_2S$), carbon dioxide ($CO_2$), etc., the environment may be corrosive to certain materials. As an example, an environment may be classified based at least in part on particulate matter that may be in a fluid (e.g., suspended, entrained, etc.). As an example, particulate matter in an environment may be abrasive or otherwise damaging to equipment. As an example, matter may be soluble or insoluble in an environment and, for example, soluble in one environment and substantially insoluble in another.

Conditions in a geologic environment may be transient and/or persistent. Where equipment is placed within a geologic environment, longevity of the equipment can depend on characteristics of the environment and, for example, duration of use of the equipment as well as function of the equipment. For example, a high-voltage power cable may itself pose challenges regardless of the environment into which it is placed. Where equipment is to endure in an environment over a substantial period of time, uncertainty may arise in one or more factors that could impact integrity or expected lifetime of the equipment. As an example, where a period of time may be of the order of decades, equipment that is intended to last for such a period of time can be constructed with materials that can endure environmental conditions imposed thereon, whether imposed by an environment or environments and/or one or more functions of the equipment itself.

Figure 2:
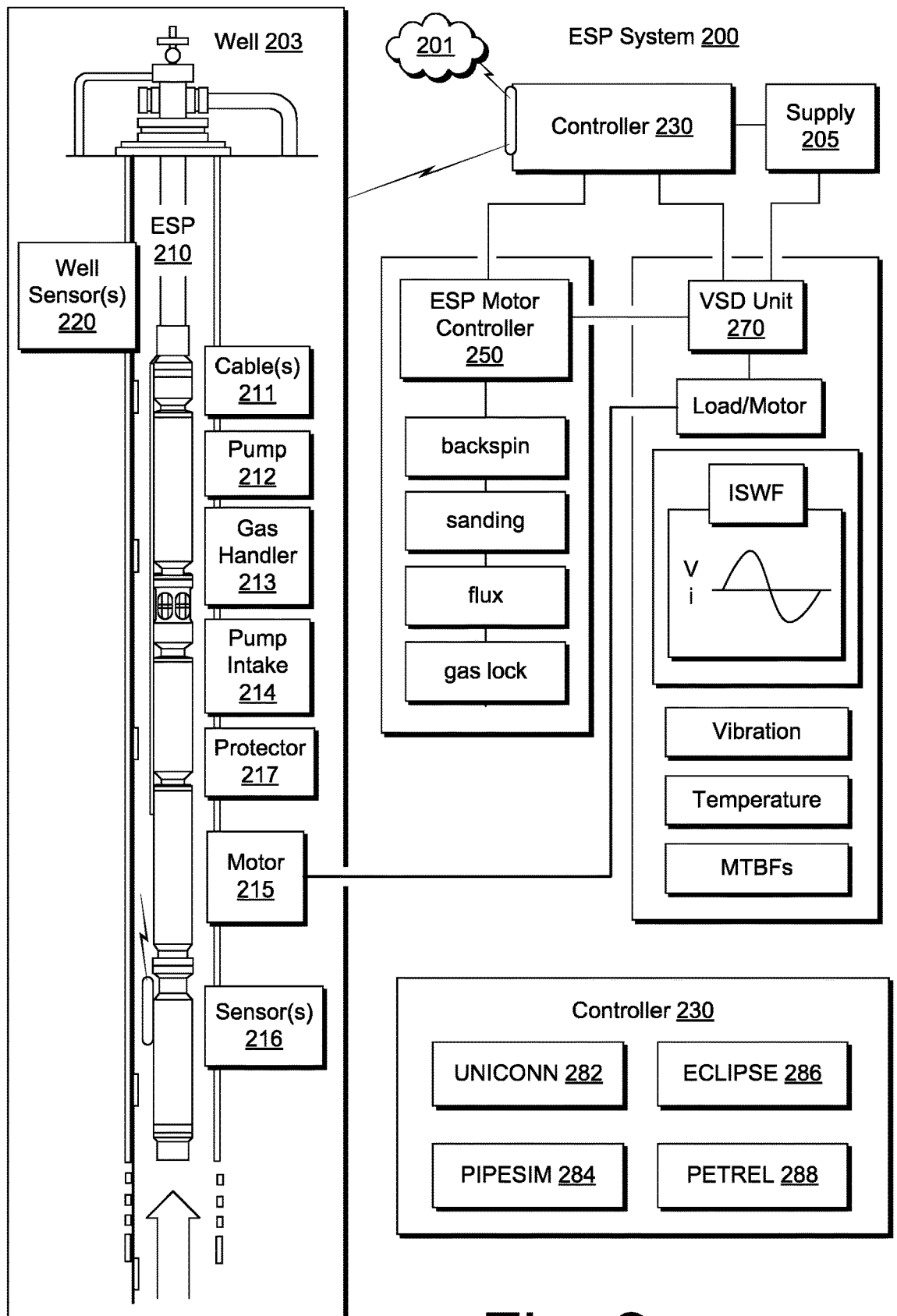
FIG. 2 illustrates an example of an electric submersible pump system.

FIG. 2 shows an example of a system 200 that includes an ESP 210 as an example of equipment that may be placed in a geologic environment. As an example, an ESP may be expected to function in an environment over an extended period of time (e.g., optionally of the order of years). As an example, a commercially available ESP (such as one of the REDA™ ESPs marketed by Schlumberger Limited, Houston, Tex.) may be employed to pump fluid(s).

In the example of FIG. 2, the system 200 includes a network 201, a well 203 disposed in a geologic environment, a power supply 205, the ESP 210, a controller 230, a motor controller 250 and a variable speed drive (VSD) unit 270. The power supply 205 may receive power from a power grid, an onsite generator (e.g., natural gas driven turbine), or other source. The power supply 205 may supply a voltage, for example, of about 4.16 kV or more.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including one or more cables 211, a pump 212, gas handling features 213, a pump intake 214, a motor 215, one or more sensors 216 (e.g., temperature, pressure, current leakage, vibration, etc.) and optionally a protector 217. The motor 215 can be a submersible electric motor that is operatively coupled to the pump 212 to drive the pump 212 for movement of fluid (e.g., to pump fluid).

As shown in FIG. 2, the well 203 may include one or more well sensors 220. As an example, a fiber-optic based sensor or other type of sensor may provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend into a well and beyond a position of an ESP.

In the example of FIG. 2, the controller 230 can include one or more interfaces, for example, for receipt, transmission or receipt and transmission of information with the motor controller 250, the VSD unit 270, the power supply 205 (e.g., a gas fueled turbine generator, a power company, etc.), the network 201, equipment in the well 203, equipment in another well, etc.

As shown in FIG. 2, the controller 230 can include or provide access to one or more frameworks. Further, the controller 230 may include features of a motor controller and optionally supplant the motor controller 250. For example, the controller 230 may include the UNICONN™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

In the example of FIG. 2, the motor controller 250 may be a commercially available motor controller such as the UNICONN™ motor controller. As an example, the UNICONN™ motor controller can perform some control and data acquisition tasks for ESPs, surface pumps or other monitored wells. For example, the UNICONN™ motor controller can interface with the PHOENIX™ monitoring system, for example, to access pressure, temperature and vibration data and various protection parameters as well as to provide direct current power to downhole sensors. The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

The UNICONN™ motor controller can include control functionality for VSD units such as target speed, minimum and maximum speed and base speed (voltage divided by frequency); three jump frequencies and bandwidths; volts per hertz pattern and start-up boost; ability to start an ESP while the motor is spinning; acceleration and deceleration rates, including start to minimum speed and minimum to target speed to maintain constant pressure/load (e.g., from about 0.01 Hz/10,000 s to about 1 Hz/s); stop mode with PWM carrier frequency; base speed voltage selection; rocking start frequency, cycle and pattern control; stall protection with automatic speed reduction; changing motor rotation direction without stopping; speed force; speed follower mode; frequency control to maintain constant speed, pressure or load; current unbalance; voltage unbalance; overvoltage and undervoltage; ESP backspin; and leg-ground.

In the example of FIG. 2, the motor controller 250 includes various features to handle, for example, backspin of an ESP, sanding of an ESP, flux of an ESP and gas lock of an ESP. As an example, the motor controller 250 may include one or more of such features, other features, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). For a LVD, a VSD unit can include a step-up transformer, control circuitry and a step-up transformer while, for a MVD, a VSD unit can include an integrated transformer and control circuitry. As an example, the VSD unit 270 may receive power with a voltage of about 4.16 kV and control a motor as a load with a voltage from about 0 V to about 4.16 kV.

As an example, an ESP cable (e.g., ESP power cable) may be rated at, for example, about 3 kV, about 4 kV, or about 5 kV (e.g., or more) and may have a form factor that is flat or round. As an example, for various subsea operations, an ESP cable may be rated at about 6 kV. As an example, a round form factor cable may be used in an application where there is sufficient room in a bore. A round form factor cable may also allow for cancelling electromagnetic interference and promoting evenness of phases to phase voltage distribution. As an example, a flat form factor cable may be used in low clearance applications within a bore or, for example, in shorter run lengths where an increase in temperature of a center conductor is not an appreciable concern during operation.

The VSD unit 270 may include commercially available control circuitry such as the SPEEDSTAR™ MVD control circuitry marketed by Schlumberger Limited (Houston, Tex.). The SPEEDSTAR™ MVD control circuitry is suitable for indoor or outdoor use and comes standard with a visible fused disconnect switch, precharge circuitry, and sine wave output filter (e.g., integral sine wave filter, ISWF) tailored for control and protection of high-horsepower ESPs. The SPEEDSTAR™ MVD control circuitry can include a plug-and-play sine wave output filter, a multilevel PWM inverter output, a 0.95 power factor, programmable load reduction (e.g., soft-stall function), speed control circuitry to maintain constant load or pressure, rocking start (e.g., for stuck pumps resulting from scale, sand, etc.), a utility power receptacle, an acquisition system for the PHOENIX™ monitoring system, a site communication box to support surveillance and control service, a speed control potentiometer. The SPEEDSTAR™ MVD control circuitry can optionally interface with the UNICONN™ motor controller, which may provide some of the foregoing functionality.

In the example of FIG. 2, the VSD unit 270 is shown along with a plot of a sine wave (e.g., achieved via a sine wave filter that includes a capacitor and a reactor), responsiveness to vibration, responsiveness to temperature and as being managed to reduce mean time between failures (MTBFs). The VSD unit 270 may be rated with an ESP to provide for about 40,000 hours (5 years) of operation (e.g., depending on environment, load, etc.). The VSD unit 270 may include surge and lightening protection (e.g., one protection circuit per phase). As to leg-ground monitoring or water intrusion monitoring, such types of monitoring may indicate whether corrosion is or has occurred. Further monitoring of power quality from a supply, to a motor, at a motor, may occur by one or more circuits or features of a controller.

While the example of FIG. 2 shows an ESP that may include centrifugal pump stages, another type of ESP may be controlled. For example, an ESP may include a hydraulic diaphragm electric submersible pump (HDESP), which is a positive-displacement, double-acting diaphragm pump with a downhole motor. HDESPs find use in low-liquid-rate coalbed methane and other oil and gas shallow wells that benefit from artificial lift to remove water from the wellbore.

HDESPs may handle a wide variety of fluids and, for example, up to about 2% sand, coal, fines and $H_2S/CO_2$.

As an example, an ESP may include a REDA™ HOTLINE™ high-temperature ESP motor. Such a motor may be suitable for implementation in various types of environments. As an example, a REDA™ HOTLINE™ high-temperature ESP motor may be implemented in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation. As an example, a motor may be a multiphase motor. As an example, a motor may include windings, etc., for three or more phases.

For connection to a power cable or motor lead extensions (MLEs), a motor may include a pothead. Such a pothead may, for example, provide for a tape-in connection with metal-to-metal seals and/or metal-to-elastomer seals (e.g., to provide a barrier against fluid entry). A motor may include one or more types of potheads or connection mechanisms. As an example, a pothead unit may be provided as a separate unit configured for connection, directly or indirectly, to a motor housing.

As an example, a motor may include dielectric oil (e.g., or dielectric oils), for example, that may help lubricate one or more bearings that support a shaft rotatable by the motor. A motor may be configured to include an oil reservoir, for example, in a base portion of a motor housing, which may allow oil to expand and contract with wide thermal cycles. As an example, a motor may include an oil filter to filter debris.

As an example, a motor housing can house stacked laminations with electrical windings extending through slots in the stacked laminations. The electrical windings may be formed from magnet wire that includes an electrical conductor and at least one polymeric dielectric insulator surrounding the electrical conductor. As an example, a polymeric insulation layer may include a single layer or multiple layers of dielectric tape that may be helically wrapped around an electrical conductor and that may be bonded to the electrical conductor (e.g., and to itself) through use of an adhesive. As an example, a motor housing may include slot liners. For example, consider a material that can be positioned between windings and laminations.

Figure 3:
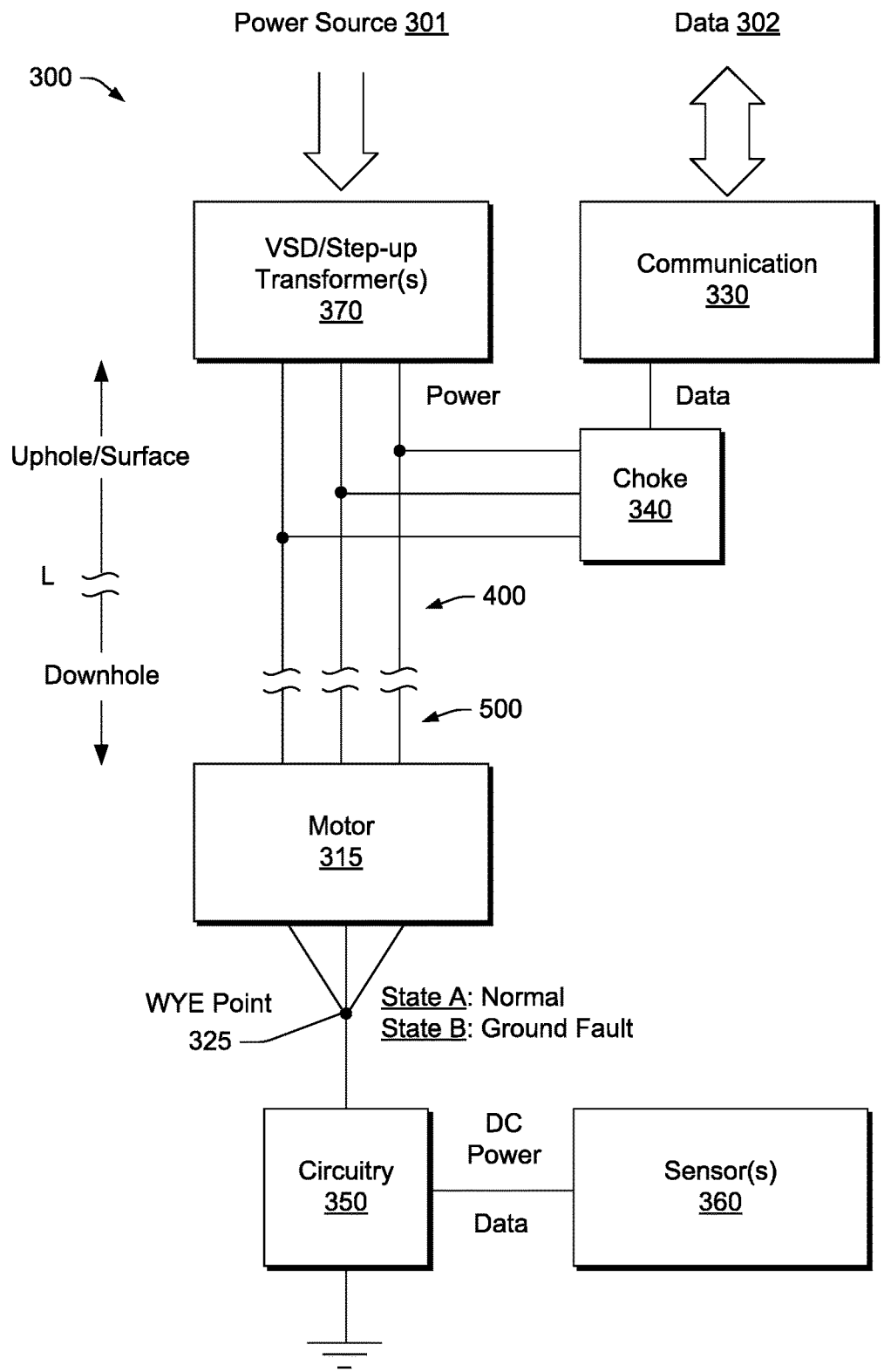
FIG. 3 illustrates examples of equipment.

FIG. 3 shows a block diagram of an example of a system 300 that includes a power cable 400 and MLEs 500. As shown, the system 300 includes a power source 301 as well as data 302. In the example of FIG. 3, the power source 301 can provide power to a VSD/step-up transformer block 370 while the data 302 may be provided to a communication block 330. The data 302 may include instructions, for example, to instruct circuitry of the circuitry block 350, one or more sensors of the sensor block 360, etc. The data 302 may be or include data communicated, for example, from the circuitry block 350, the sensor block 360, etc. In the example of FIG. 3, a choke block 340 can provide for transmission of data signals via the power cable 400 and the MLEs 500.

As shown, the MLEs 500 connect to a motor block 315, which may be a motor (or motors) of a pump (e.g., an ESP, etc.) and be controllable via the VSD/step-up transformer block 370. In the example of FIG. 3, the conductors of the MLEs 500 electrically connect at a WYE point 325. The circuitry block 350 may derive power via the WYE point 325 and may optionally transmit, receive or transmit and receive data via the WYE point 325. As shown, the circuitry block 350 may be grounded.

The system 300 can operate in a normal state (State A) and in a ground fault state (State B). One or more ground faults may occur for one or more of a variety of reasons. For example, wear of the power cable 400 may cause a ground fault for one or more of its conductors. As another example, wear of one of the MLEs may cause a ground fault for its conductor. As an example, gas intrusion, fluid intrusion, etc. may degrade material(s), which may possibly lead a ground fault.

The system 300 may include provisions to continue operation of a motor of the motor block 315 when a ground fault occurs. However, when a ground fault does occur, power at the WYE point 325 may be altered. For example, where DC power is provided at the WYE point 325 (e.g., injected via the choke block 340), when a ground fault occurs, current at the WYE point 325 may be unbalanced and alternating. The circuitry block 350 may or may not be capable of deriving power from an unbalanced WYE point and, further, may or may not be capable of data transmission via an unbalanced WYE point.

The foregoing examples, referring to "normal" and "ground fault" states, demonstrate how ground faults can give rise to various issues. Power cables and MLEs that can resist damaging forces, whether mechanical, electrical or chemical, can help ensure proper operation of a motor, circuitry, sensors, etc. Noting that a faulty power cable (or MLE) can potentially damage a motor, circuitry, sensors, etc. Further, as mentioned, an ESP may be located several kilometers into a wellbore. Accordingly, the time and cost to replace a faulty ESP, power cable, MLE, etc., can be substantial.

Figure 4:
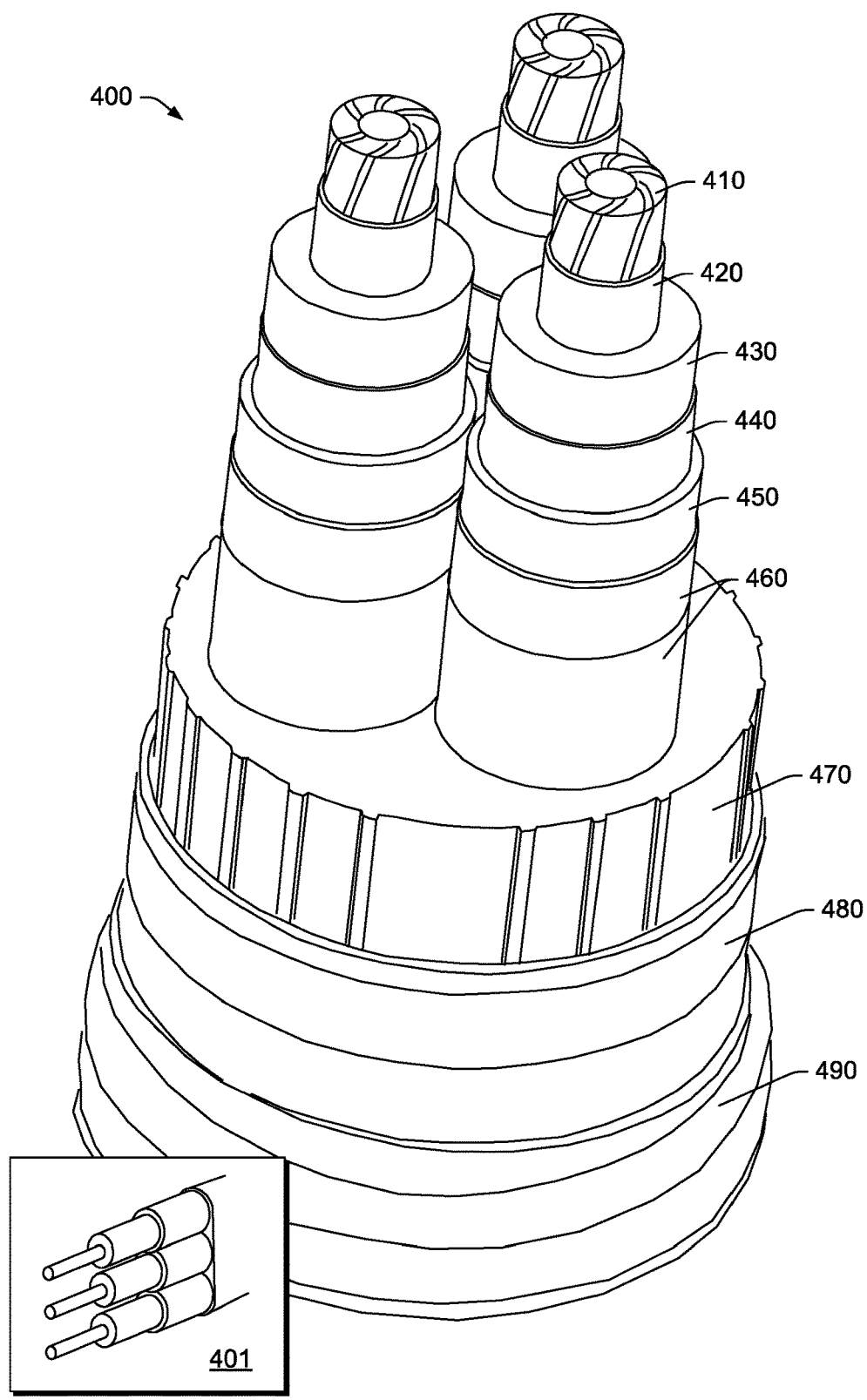
FIG. 4 illustrates examples of cables.

FIG. 4 shows an example of the power cable 400, suitable for use in the system 300 of FIG. 3 or optionally one or more other systems (e.g., SAGD, etc.). In the example of FIG. 4, the power cable 400 includes three conductor assemblies where each assembly includes a conductor 410, a conductor shield 420, insulation 430, an insulation shield 440, a metallic shield 450, and one or more barrier layers 460. The three conductor assemblies are seated in a cable jacket 470, which is surrounded by a first layer of armor 480 and a second layer of armor 490. As to the cable jacket 470, it may be round or as shown in an alternative example 401, rectangular (e.g., "flat").

As an example, a power cable may include, for example, conductors that are made of copper (see, e.g., the conductors 410); an optional conductor shield for each conductor (see, e.g., the conductor shield 420), which may be provided for voltage ratings in excess of about 5 kV; insulation such as high density polyethylene (HDPE), polypropylene or EPDM (e.g., where The E refers to ethylene, P to propylene, D to diene and M refers to a classification in ASTM standard D-1418; e.g., ethylene copolymerized with propylene and a diene or ethylene propylene diene monomer (M-class) rubber) dependent on temperature rating (see, e.g., the insulation 430); an insulation shield (see, e.g., the insulation shield 440), which may be provided for voltage ratings in excess of about 5 kV, where the insulation shield includes a polymeric material such as, for example, a nitrile rubber type of polymeric material (e.g., NBR, HNBR, etc.) and/or a metallic shield that may include metallic lead (Pb) (see, e.g., the metallic shield 450); a barrier layer that may include fluoropolymer (see, e.g., the barrier layer(s) 460); a jacket that may include oil resistant EPDM or nitrile rubber (see, e.g., the cable jacket 470); and one or more layers of armor that may include galvanized, stainless steel, MONEL™ alloy (marketed by Inco Alloys International, Inc., Huntington, W. Va.), etc. (see, e.g., the armor 480 and the armor 490).

As an example, the insulation shield 440 may be considered a barrier layer, for example, which may be formed of a continuous polymeric sheath as extruded about the insulation 430.

As an example, the metallic shield 450 may be considered a barrier layer, for example, which may be formed of a continuous metallic lead (Pb) sheath as extruded about the insulation 430 and/or the insulation shield 440, if present.

In some commercially available REDAMAX™ cables, polytetrafluoroethylene (PTFE) tape is used to form a barrier layer to block fluid and gas entry. For REDALEAD™ cables, metallic lead (Pb) is extruded directly on top of the insulation (see, e.g., the insulation 430 and/or the insulation shield 440) to help prevent diffusion of gas into the insulation (e.g., one or more corrosive gases). The high barrier properties and malleability of metallic lead (Pb) tend to make it a suitable candidate for downhole cable components.

As an example, manufacture of an inline longitudinal wrapped gas impermeable barrier may include utilizing with a lead (Pb) alloy (e.g., Pb—Sn—Sb crystal structure) tape. As an example, an inline longitudinal wrapped gas impermeable barrier that includes a lead (Pb) alloy tape for gas sealing may be disposed about individual insulated copper conductors within a multi-phase conductor assembly.

In the example of FIG. 4, as to the conductor 410, it may be solid or compacted stranded high purity copper and coated with a metal or alloy (e.g., tin, lead, nickel, silver or other metal or alloy). As to the conductor shield 420, it may optionally be a semiconductive material with a resistivity less than about 5000 ohm-m and be adhered to the conductor 410 in a manner that acts to reduce voids therebetween (e.g., consider a substantially voidless adhesion interface). As an example, the conductor shield 420 may be provided as an extruded polymer that penetrates into spaces between strands of the stranded conductor 410. As to extrusion of the conductor shield 420, it may optionally be co-extruded or tandem extruded with the insulation 430 (e.g., which may be or include EPDM). As an option, nanoscale fillers may be included for low resistivity and suitable mechanical properties (e.g., for high temperature thermoplastics).

As to the insulation 430, it may be bonded to the conductor shield 420. As an example, the insulation 430 can include EPDM.

As to the insulation shield 440, it may optionally be a semiconductive material having a resistivity less than about 5000 ohm-m. The insulation shield 440 may be adhered to the insulation 430, but, for example, removable for splicing (e.g., together with the insulation 430), without leaving a substantial amount of residue. As an example, the insulation shield 440 may be extruded polymer, for example, co-extruded with the insulation 430.

As an example, the insulation shield 440 can include one or more materials dispersed in a polymeric material where such one or more materials alter the conductivity of the insulation shield 440.

As to the metallic shield 450 and the barrier layer(s) 460, one or more layers of material may be provided. One or more layers may be provided, for example, to create an impermeable gas barrier. As an example, the cable 400 may include PTFE fluoropolymer, for example, as tape that may be helically taped.

As to the cable jacket 470, it may be round or as shown in the example 401, rectangular (e.g., "flat"). As to material of construction, a cable jacket may include one or more layers of EPDM, nitrile, hydrogenated nitrile butadiene rubber (HNBR), fluoropolymer, chloroprene, or other material (e.g., to provide for resistance to a downhole and/or other environment). As an example, each conductor assembly phase may include solid metallic tubing, such that splitting out the phases is more easily accomplished (e.g., to terminate at a connector, to provide improved cooling, etc.).

As to the cable armor 480 and 490, metal or metal alloy may be employed, optionally in multiple layers for improved damage resistance.

Figure 5:
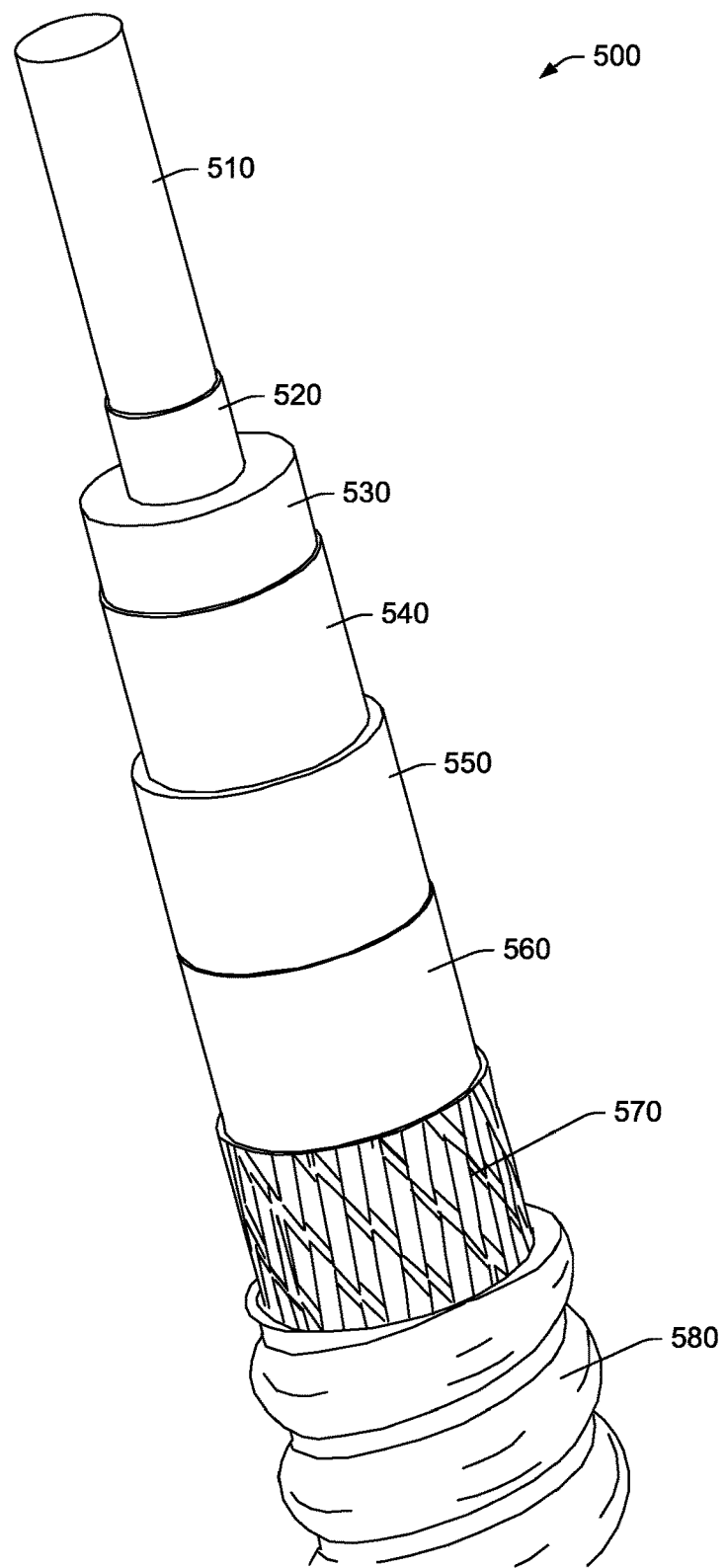
FIG. 5 illustrates an example of a motor lead extension (MLE)

FIG. 5 shows an example of one of the MLEs 500 suitable for use in the system 300 of FIG. 3 or optionally one or more other systems (e.g., SAGD, etc.). In the example of FIG. 5, the MLE 500 (or "lead extension") a conductor 510, a conductor shield 520, insulation 530, an insulation shield 540 and/or a metallic shield 550, one or more other barrier layers 560, a braid layer 570 and armor 580. While the example of FIG. 5 mentions MLE or "lead extension", it may be implemented as a single conductor assembly cable for one or more of a variety of downhole uses.

As to a braid or a braided layer, various types of materials may be used such as, for example, polyethylene terephthalate (PET) (e.g., applied as a protective braid, tape, fabric wrap, etc.). PET may be considered as a low cost and high strength material. As an example, a braid layer can help provide protection to a soft lead jacket during an armor wrapping process. In such an example, once downhole, the function of the braid may be minimal. As to other examples, nylon or glass fiber tapes and braids may be implemented. Yet other examples can include fabrics, rubberized tapes, adhesive tapes, and thin extruded films.

As an example, a conductor (e.g., solid or stranded) may be surrounded by a semiconductive material layer that acts as a conductor shield where, for example, the layer has a thickness greater than approximately 0.005 inch (e.g., approximately 0.127 mm). As an example, a cable can include a conductor with a conductor shield that has a radial thickness of approximately 0.010 inch (e.g., approximately 0.254 mm). As an example, a cable can include a conductor with a conductor shield that has a radial thickness in a range from greater than approximately 0.005 inch to approximately 0.015 inch (e.g., approximately 0.127 mm to approximately 0.38 mm).

As an example, a conductor may have a conductor size in a range from approximately #8 AWG (e.g., OD approx. 0.128 inch or area of approx. 8.36 mm$^2$) to approximately #2/0 "00" AWG (e.g., OD approx. 0.365 inch or area of approx. 33.6 mm$^2$). As examples, a conductor configuration may be solid or stranded (e.g., including compact stranded). As an example, a conductor may be smaller than #8 AWG or larger than #2/0 "00" AWG (e.g., #3/0 "000" AWG, OD approx. 0.41 inch or area of approx. 85 mm$^2$).

As an example, a cable may include a conductor that has a size within a range of approximately 0.1285 inch to approximately 0.414 inch (e.g., approximately 3.26 mm to approximately 10.5 mm) and a conductor shield layer that has a radial thickness within a range of approximately greater than 0.005 inch to approximately 0.015 inch (e.g., approximately 0.127 mm to approximately 0.38 mm).

Figure 6:
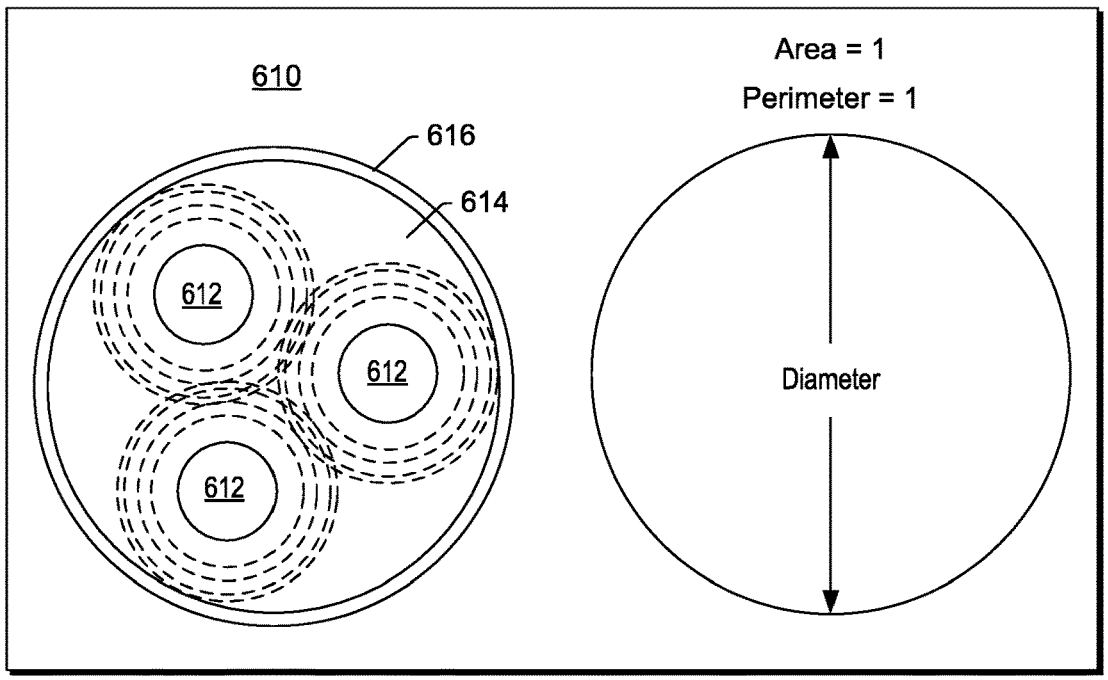
FIG. 6 illustrates examples of arrangements of assemblies.
Figure 6:
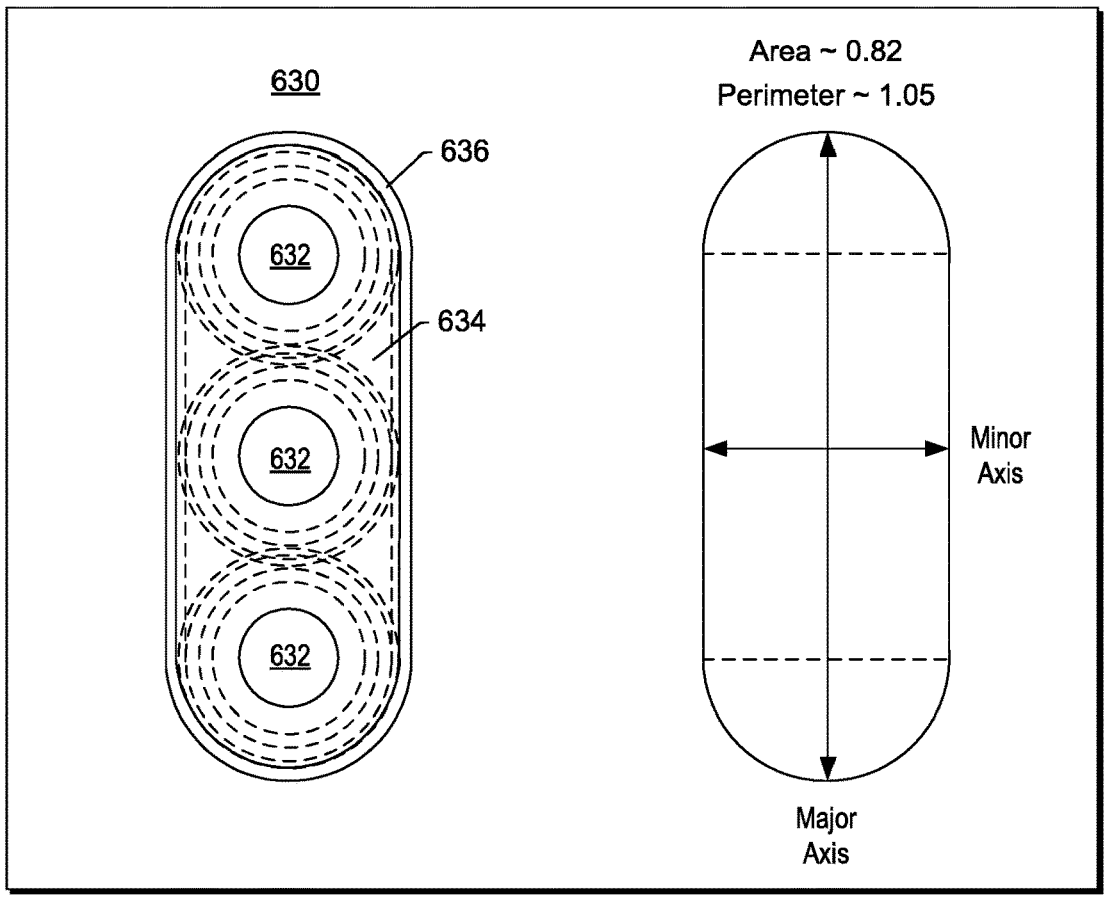

FIG. 6 shows an example of a geometric arrangement of components of a round cable 610 and an example of a geometric arrangement of components of an oblong cable 630. As shown the cable 610 includes three conductors 612, a polymeric layer 614 and an outer layer 616 and the oblong cable 630 includes three conductors 632, a polymeric layer 634 (e.g., optionally a composite material with desirable heat transfer properties) and an optional outer polymeric layer 636 (e.g., outer polymeric coat, which may be a composite material). In the examples of FIG. 6, a conductor may be surrounded by one or more optional layers, as generally illustrated via dashed lines. For example, as to the cable 630, consider three 1 gauge conductors (e.g., a diameter of about 7.35 mm) with various layers. In such an example, the polymeric layer 634 may encapsulate the three 1 gauge conductors and their respective layers where, at ends, the polymeric layer 634 may be about 1 mm thick. In such an example, an optional armor layer may be of a thickness of about 0.5 mm. In such an example, the optional outer polymeric layer 636 (e.g., as covering armor) may be of a thickness of about 1 mm (e.g., a 1 mm layer).

As shown in FIG. 6, the cable 610 includes a circular cross-sectional shape while the cable 630 includes an oblong cross-sectional shape. In the example of FIG. 6, the cable 610 with the circular cross-sectional shape has an area of unity and the cable 630 with the oblong cross-sectional shape has area of about 0.82. As to perimeter, where the cable 610 has a perimeter of unity, the cable 630 has a perimeter of about 1.05. Thus, the cable 630 has a smaller volume and a larger surface area when compared to the cable 610. A smaller volume can provide for a smaller mass and, for example, less tensile stress on a cable that may be deployed a distance in a downhole environment (e.g., due to mass of the cable itself).

In the cable 630, the conductors 632 may be about 7.35 mm (e.g., about 1 AWG) in diameter with insulation of about 2 mm thickness, metallic lead (Pb) of about 1 mm thickness (e.g., as a gas barrier layer), a jacket layer (e.g., the layer 634) over the lead (Pb) of about 1 mm thickness at ends of the cable 630, optional armor of about 0.5 mm thickness and an optional polymeric layer of about 1 mm thickness (e.g., the layer 636 as an outer polymeric coat). As an example, armor can include a strap thickness, which may be singly or multiply applied (e.g., double, triple, etc.). As an example, the cable 630 may be of a width of about 20 mm (e.g., about 0.8 inches) and a length of about 50 mm (e.g., about 2 inches), for example, about a 2.5 to 1 width to length ratio).

As an example, a cable may be formed with phases split out from each other where each phase is encased in solid metallic tubing.

As an example, a cable can include multiple conductors where each conductor can carry current of a phase of a multiphase power supply for a multiphase electric motor. In such an example, a conductor may be in a range from about 8 AWG (about 3.7 mm) to about 00 AWG (about 9.3 mm).

TABLE 1

Examples of Components.

| Cable Component | Dimensions |
| --- | --- |
| Conductor (Cu) | 8 AWG to 00 AWG (3.7 mm to 9.3 mm) |
| Insulation | 58 mils to 130 mils (1.5 mm to 3.3 mm) |
| Shield (e.g., Non-Metallic) | 10 mils to 25 mils (0.25 to 0.635 mm) |
| Metallic Shield | 20 mils to 60 mils (0.5 mm to 1.5 mm) |
| Jacket (e.g., optional) | 20 mils to 85 mils (0.5 mm to 2.2 mm) |
| Armor (e.g., optional) | 10 mils to 120 mils (0.25 mm to 3 mm) |
| Polymeric Coat (e.g., optional) | 20 mils to 60 mils (0.5 mm to 1.5 mm) |

In Table 1, the insulation can include a shield that is non-metallic and/or a shield that is metallic. For example, a metallic shield can be a lead (Pb) based shield that is relatively gas impermeable. As an example, a non-metallic shield may be relatively gas impermeable. As mentioned, insulation may be formulated as a compound with one or more alkane-based peroxides that can provide for radical polymerization where the one or more alkane-based peroxides form radicals that can form decomposition products, which may have a maximum molecular weigh less than about 100. In such an example, the decomposition products can be non-aromatic.

As an example, a cable may include conductors for delivery of power to a multiphase electric motor with a voltage range of about 3 kV to about 8 kV. As an example, a cable may carry power, at times, for example, with amperage of up to about 200 A or more.

As to operational conditions, where an electric motor operates a pump, locking of the pump can cause current to increase and, where fluid flow past a cable may decrease, heat may build rapidly within the cable. As an example, locking may occur due to gas in one or more pump stages, bearing issues, particulate matter, etc. As an example, a cable may carry current to power a multiphase electric motor or other piece of equipment (e.g., downhole equipment powerable by a cable).

As an example, in some flat power cable embodiments, two or more individual coated conductors can be arranged in a side-by-side configuration (e.g., consider configurations such as 2×1, 3×1, 4×1, etc.) and, for example, one or more armor layers can be applied over a jacket.

As an example, an insulation shield layer can optionally be a semi-conductive layer applied over an insulation layer to minimize electrical stresses in a cable. In some embodiments, the insulation shield layer is formed from a hydrogenated nitrile butadiene rubber (HNBR). In some embodiments, the insulation shield layer is formed from a FEPM polymer, such as AFLAS® 100S polymer. In some embodiments, an insulation shield layer can be formed from a FKM polymer. In some embodiments, an insulation shield layer is extruded over an insulation layer. For example, in embodiments that include an HNBR insulation shield layer extruded over an EPDM insulation layer, the insulation shield layer may impart enhanced damage resistance in addition to improved resistance to well fluids and gases to the cable.

In some embodiments, an insulation shield layer may be substantially bonded to an insulation layer (e.g., via cross-linking, etc.). In other embodiments, an insulation shield layer may be adhered to an insulation layer using an appropriate adhesive or adhesives based on one or more of the respective materials of the insulation layer and insulation shield layer. In some embodiments, an insulation shield may be strippable (e.g., to allow for termination and electrical testing of the cable). As an example, insulation and shield may be strippable as a unit, for example, where substantially cross-linked at an interface between the insulation and the shield.

In some embodiments, an insulation shield layer can be applied via extrusion. For some embodiments, an insulation shield layer may be co-extruded with an insulation layer. In other embodiments, an insulation shield layer may be tandem extruded with an insulation layer. In yet other embodiments, an insulation layer may be extruded in a first extrusion process and an insulation shield layer applied as a partially completed cable is re-run back through the extruder, such as in a two-pass extrusion method.

In some embodiments, one or more compatibilizers may be used to help ensure that cross-linking occurs at an interface between an insulation layer (e.g., constructed from EPDM, etc.) and an insulation shield layer. In some embodiments, an insulation layer and insulation shield layer can be co-extruded via pressure extrusion and cured using compatible cure systems with substantially similar cure rates.

As an example, a metallic shield layer may be applied over an insulation shield layer. In such an example, the metallic shield layer may serve as a ground plane. In some embodiments, a metallic shield layer may serve to electrically isolate the phases of the cable from each other. As an example, a metallic shield layer may be formed from a number of metallic materials including, but not limited to: copper, aluminum, lead, and alloys thereof. In some embodiments, a metallic shield layer may be formed as a conductive material tape, braid, paint, or extrusion layer.

As an example, a metallic shield layer may be a type of barrier layer that aims to provide protection against migration of gas from an exterior region to an interior region. As an example, a lead (Pb) based barrier layer can be a metallic shield layer that can also serve as a ground plane.

As an example, a barrier layer can be a layer exterior to a shield (e.g., an insulation shield layer) that may aim to provide additional protection from corrosive downhole gases and fluids. In some embodiments, a barrier layer may be formed as an extruded layer while in other embodiments a barrier layer may be formed as a taped layer. In some embodiments, a barrier layer may be formed from one or more fluoropolymers, lead, or another material resistant to downhole gases and fluids. In some embodiments, a combination of extruded and taped layers may be used to form the barrier layer.

As an example, a cable jacket may offer fluid-, gas-, and/or temperature-resistance to a cable. In some embodiments, a jacket may be constructed from one or more layers of one or more materials (e.g., consider one or more of EPDM, nitrile rubber, HNBR, fluoropolymers, chloroprene, or another material offering suitable resistance to downhole conditions).

In some embodiments, a cable may use EPDM and/or nitrile based elastomer compounds in a jacketing layer. In some embodiments, one or more jacket layer compounds may be oil and/or water and/or brine and/or thermal and/or decompression resistant.

As an example, cable armor may be constructed from one or more of a variety of materials including, but not limited to, one or more of galvanized steel, stainless steel, MONEL™ alloy, or another metal, metal alloy, or non-metal resistant to downhole conditions. In some embodiments, cable armor can encase a plurality of wrapped conductors. In other embodiments, each wrapped conductor may be individually encased in its own cable armor.

Figure 7:
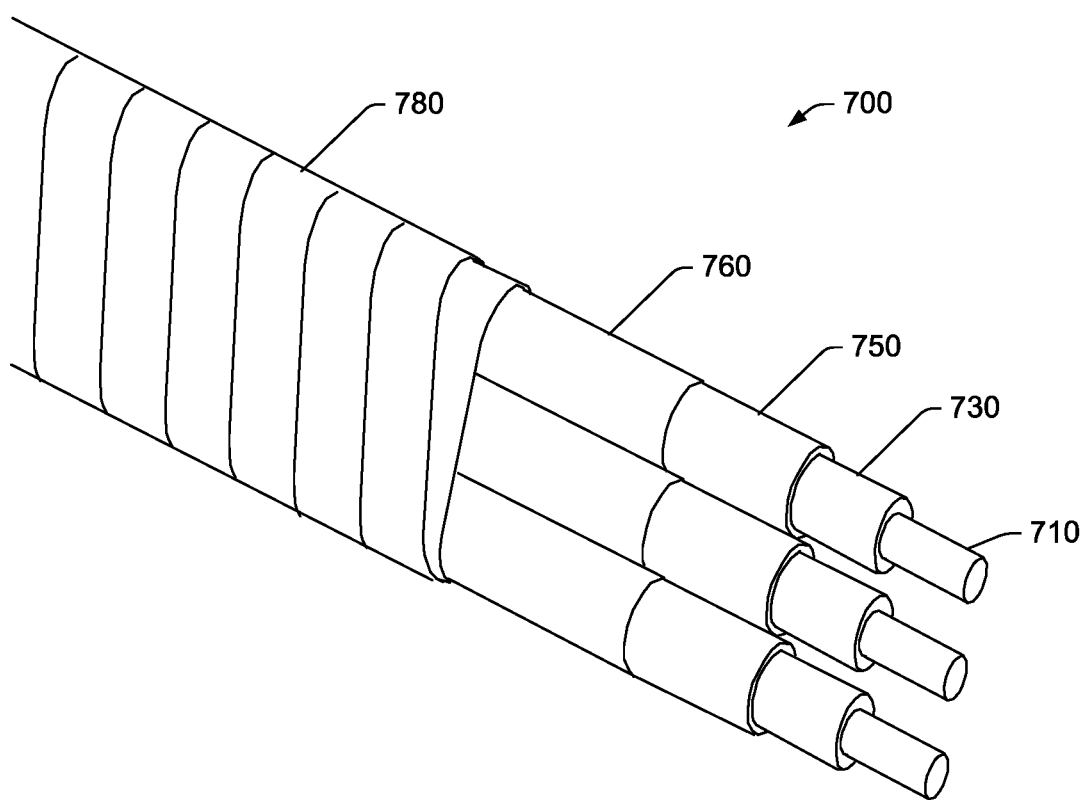
FIG. 7 illustrates examples of cables.
Figure 7:
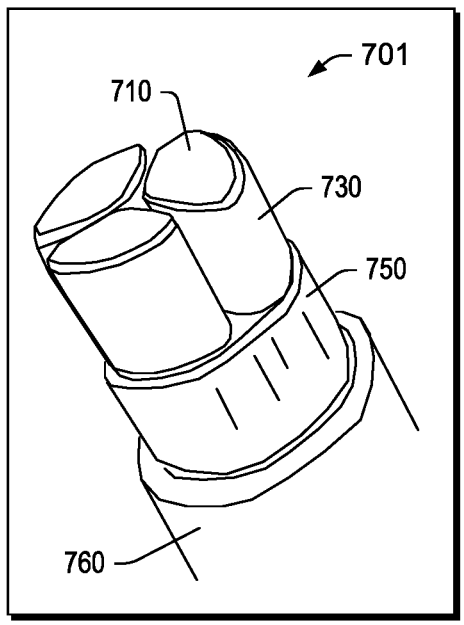
Figure 7:
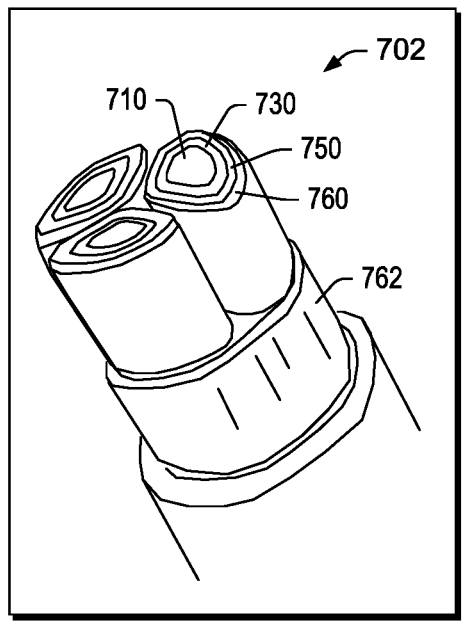

FIG. 7 shows an example of a power cable 700, an example of a power cable 701, and an example of a power cable 702 where the power cable 700, 701 and/or 702 may be suitable for use in the system 300 of FIG. 3 or optionally in one or more other systems (e.g., SAGD, etc.).

In FIG. 7, the power cable 700 includes three conductor assemblies where each assembly includes a conductor 710, insulation 730, a metallic shield 750, a cushion layer 760 and an armor layer 780. In FIG. 7, the power cable 700 is configured with a flat geometry; whereas, the power cables 701 and 702 are configured with a round geometry where conductors are substantially pie shaped in their cross-section.

In the geometry of the power cable 701, three assemblies are shown where each assembly includes a conductor 710 (e.g., a substantially pie shaped conductor with an arc span of approximately 120 degrees) and insulation 730 (e.g., a substantially pie shaped layer of insulation that surrounds the conductor 710). As shown, the three assemblies can be grouped (e.g., 120 degrees each to form a circular cross-section of 360 degrees) and a metallic shield 750 can be applied that surrounds the three assemblies where a cushion layer 760 can be further applied that surrounds the metallic shield 750.

In the geometry of the power cable 702, three assemblies are shown where each assembly includes a conductor 710 (e.g., a substantially pie shaped conductor with an arc span of approximately 120 degrees), insulation 730 (e.g., a substantially pie shaped layer of insulation that surrounds the conductor 710), a metallic shield 750 (e.g., a substantially pie shaped layer of lead (Pb) that surrounds the insulation 730, and a cushion layer 760 (e.g., a substantially pie shaped layer of material that surrounds the metallic shield 750. As shown, the three assemblies can be grouped (e.g., 120 degrees each to form a circular cross-section of 360 degrees) and one or more additional layers can be applied that surrounds the three assemblies where one or more of such layers can include armor. As an example, a layer 762 may be an additional cushion layer 762 that surrounds the three cushion layers 760 of the grouped assemblies, which can further help to protect the metallic shields 750 from an armoring process.

As mentioned, an individual cushion layer may surround an individual one of a metallic shield where such a cushion layer may be substantially circular in shape, substantially pie shaped, or another shape. As an example, an additional cushion layer may be applied that surrounds assemblies where the additional cushion layer is substantially circular in its cross-sectional shape (e.g., an annular wall about a group of assemblies).

As an example, one or more cushion layers may be extruded and include a crosslinkable polymeric material that can crosslink to achieve a desired crosslink density. In such an example, an extruded cushion layer can achieve a desired hoop stress, which can help the extruded cushion layer to retain its shape. As mentioned, the shape of a cushion layer may be substantially circular or of another shape such as, for example, substantially pie shaped where it may surround a substantially pie shaped metallic barrier layer (e.g., a lead (Pb) barrier layer). As an example, a substantially circular shaped cushion layer may be extruded about a plurality of substantially pie shaped cushion layers that are grouped.

As explained, conductor and/or assembly geometries can be grouped where geometry of one or more cushion layers may be appropriately shaped to help preserve integrity of one or more metallic shields, which may function as gas barriers that can help to hinder permeation of gas (e.g., $H_2S$, etc.) toward a conductor of a power cable. Such one or more cushion layers can help to preserve integrity of one or more metallic shields from a manufacturing process such as, for example, an armoring process. For example, the power cable 701 can include armor where the cushion layer 760 helps to protect one or more metallic shields from deformation due to force imparted during an armoring process and the power cable 702 can include armor where the cushion layers 760 and/or the cushion layer 762 help to protect one or more metallic shields from deformation due to force imparted during an armoring process.

In FIG. 7, the conductor 710 can be a solid copper conductor, the insulation 730 can be an EPDM-based insulation, the metallic shield 750 can be a metallic lead (Pb) shield (e.g., a lead (Pb) layer), the cushion layer 760 can be an extruded polyethylene layer that has achieved a desired amount crosslinked (e.g., crosslinked polyethylene "XLPE") and the armor layer 780 can be a metallic armor. As an example, the cushion layer 760 can include one or more additional materials such as, for example, talc and/or polypropylene. As an example, a cushion layer can include a material such as carbon black. As an example, a cushion layer can include a colorant (e.g., for color coding phases of a multiphase power cable).

In FIG. 7, the cushion layer 760 is exterior to the metallic shield 750 such that it can mechanically cushion the metallic shield 750. For example, the cushion layer 760 can mechanically cushion the metallic shield 750 from force that can be applied by and/or conducted by the armor of the armor layer 780, which may be, for example, a galvanized metallic armor. Such cushioning can help to preserve the integrity of the metallic shield 750 via one or more mechanisms. As one example, the cushion layer 760 can be formed of a material with a shape and size that helps to maintain the shape and size of the metallic shield 750. In such an example, the shapes may be substantially circular. As an example, the cushion layer 760 can be formed as a tube defined at least in part by a wall thickness and an inner cross-section dimension (e.g., an inner diameter) and/or an outer cross-section dimension (e.g., an outer diameter). As mentioned, a cushion layer may be of a non-circular shape such as substantially pie shape. Such a shape may be defined by one or more parameters such as, for example, an arc angle.

In FIG. 7, the example cable 700 can include EPDM insulation as the insulation 730, which can have a wall thickness of approximately 1.6 mm (e.g., approximately 0.065 inch), can include a lead (Pb) shield as the metallic shield 750, which can have a wall thickness of approximately 0.6 mm (e.g., approximately 0.025 inch), can include crosslinked polyethylene as the cushion layer 760 and can include metallic armor (e.g., galvanized) as the armor layer 780, which can have a wall thickness of approximately 0.4 mm (e.g., approximately 0.015 inch). As an example, the insulation 730 can have a wall thickness that is less than approximately 2 mm. As an example, the metallic shield 750 can have a wall thickness that is less than approximately 1 mm. As an example, the armor layer 780 can have a wall thickness that is less than approximately 0.5 mm.

As mentioned, a cable can include lead (Pb), which can be in the form of a lead (Pb) layer (e.g., a barrier layer). Lead (Pb) can creep, which is slow plastic deformation of a material under a constant stress. Lead (Pb) has a melting temperature of 327.5 degrees C., which is relatively low for a metal (e.g., copper (Cu) has a melting temperature of 1084 degrees C.). As such, lead (Pb) can creep at ambient temperature (e.g., 25 degrees C.) when pressure of several megapascals (MPa) is applied. The Young's modulus of lead (Pb) is approximately 16 GPa, which is relatively low for a metal (e.g., copper (Cu) has a Young's modulus of approximately 117 GPa). The Young's modulus is the ratio of stress (force per unit area) to strain (dimensionless deformation) in a material. The Young's modulus is known to be a measure of stiffness of a material. The folklore tells of a bite test for gold nuggets, where the pressure of an average human bite may be approximately 1 MPa (e.g., about 160 psi). The Young's modulus of gold (Au) is approximately 79 GPa. As may be appreciated from the foregoing values, a pressure of several MPa can deform lead (Pb).

Lead (Pb) may be included in a cable as an extruded protective layer, which may be referred to as a lead (Pb) barrier or lead (Pb) barrier layer. Such a layer can help protect a copper conductor (e.g., and/or insulation) from substances such as hydrogen sulfide gas and may increase the maximum operation temperature of a cable.

Where a cable includes EPDM insulation adjacent to a copper conductor, a lead (Pb) layer may be placed over the EPDM insulation and a fabric tape or a braid (e.g., a braided fiber) may be placed over the lead (Pb) layer as a manufacturing aid to minimize distortion of the lead (Pb) layer during armoring.

Where a cable includes polypropylene insulation adjacent to a copper conductor, a lead (Pb) layer may be placed over the polypropylene insulation, which can increase its temperature rating (e.g., from about 96 degrees C. to about 125 degrees C.).

The Young's modulus of polypropylene is approximately 1.5 to 2 GPa while the Young's modulus of EPDM is less.

In the foregoing EPDM insulation approach and the foregoing polypropylene insulation approach, the stiffness of the insulation can have an effect on armoring with respect to distortion of the lead (Pb) layer. In general, as polypropylene insulation is stiffer than EPDM insulation, a fabric tape or braid may be foregone when the insulation is polypropylene insulation. However, in both approaches, armoring can still distort a lead (Pb) layer.

A cable can include armor to impart mechanical integrity. Armor can be, for example, galvanized steel, stainless steel, an alloy (e.g., MONEL alloy) or another type of metal or alloy. Armor can be provided as a strip that is wrapped about one or more insulated conductors that can each include an individual lead (Pb) layer.

The armor wrapping process applies force. Further, when applied as a wrapped strip, the armor can gouge or cut into a layer such as a lead (Pb) layer. To reduce this damage, as mentioned, a taped or braided fiber layer can be applied over a lead (Pb) layer to provide resistance to damage from the armoring process. Such tapes or braids tend to be plastic (polyester or nylon) or glass fibers that are woven or wrapped around the lead (Pb) covered conductor. While these wraps provide some protection, for maximum effectiveness, thickness tends to matter. As such, they can be applied thickly up to 0.5 mm or 0.020 inch. Such tapes or braids tend to be expensive and slow a manufacturing process.

For ESP cables operated in one or more of corrosive, gassy or hot environments, the performance of a lead (Pb) barrier layer helps to assure long run times. Even small residual creases in a lead (Pb) layer from an armoring process have been shown to cause premature failure due to effects such as crevice corrosion. For this reason, protecting the lead sheath during the subsequent manufacturing process and handling during shipping and installation is beneficial.

Referring again to the cable 700 of FIG. 7, in such an example, a taped or braided protective layer over a lead (Pb) barrier can be replaced by a solid extruded protective layer. For example, the cushion layer 760 can be formed by extrusion of material about the exterior surface of the metallic shield 750, which can be a lead (Pb) layer.

A cushion layer such as the cushion layer 760 (e.g., and/or the cushion layer 762) can provide for improved performance of a cable. As an extruded material, the cushion layer 760 differs from braid materials, which can be formed of nylon or polyethylene terephthalate string, which are mechanically robust during manufacturing but tend to hydrolyze rapidly at temperatures above approximately 80 degrees C. in the presence of moisture ($H_2O$). Hydrocarbon wells tend to include some amount of moisture and cable operating temperatures regularly exceed 80 degrees C. Under such conditions, the aforementioned braid material can degrade and can even dissipate relatively quickly after installation in a hydrocarbon well. The extruded cushion layer 760 can be made of one or more materials that can include one or more materials such as chemically resistant polymers as well as crosslinked structures. The cushion layer 760 can be made of one or more extruded materials that can persist in a downhole environment of a hydrocarbon well over a longer term than nylon or polyethylene terephthalate string, which can help to maintain lead (Pb) layer protection. A cable that includes an extruded cushion layer may be suitable for use for multiple installation and retrieval runs.

An extruded cushion layer can provide improved lead (Pb) barrier crush resistance from the armoring process when compared to a braided approach that uses nylon or polyethylene terephthalate string. For example, an extruded cushion layer can use a soft yet tough polymeric material such that force applied to a protective lead (Pb) layer will be absorbed as the cushion deforms, which can help to reduce indentation depth and size as to the protective lead (Pb) layer.

An extruded cushion layer can improve radial strength of a protective lead (Pb) layer when compared to a braided approach that uses nylon or polyethylene terephthalate string. As taped or braided designs tend to provide substantially lesser radial strength, when tape or braid is used, protective lead (Pb) layers, each about a respective conductor, get pressed together during the armoring process. Such pressing causes deformation of the protective lead (Pb) layers. This deformation can grow to be much worse downhole in a well, particularly when the cable is heated and the insulation thermally expands. Over time, creep can occur and failure of one or more of the protective lead (Pb) walls between conductors.

Figure 8:
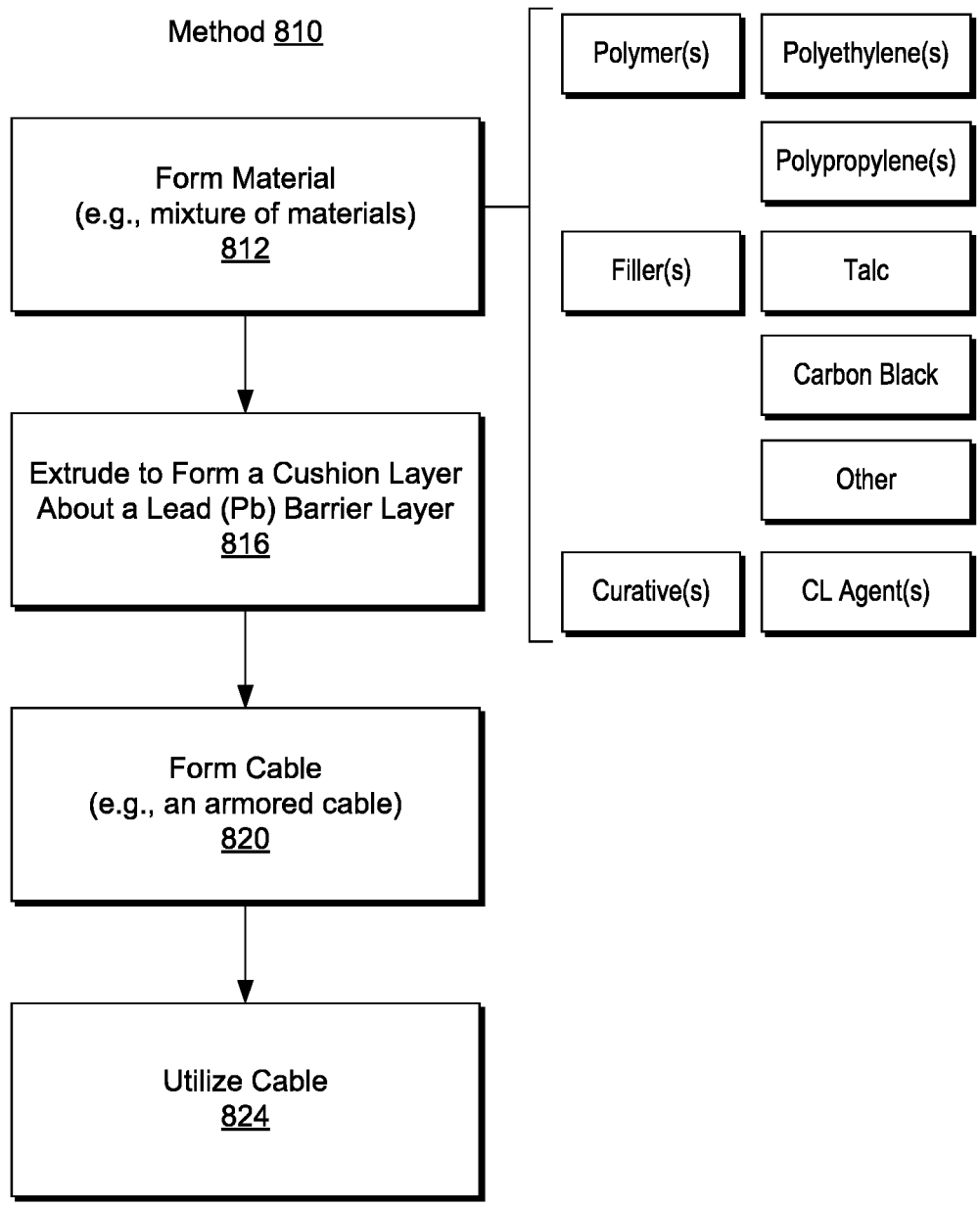
FIG. 8 illustrates an example of a method.

FIG. 8 shows an example of a method 810 that includes a formulation block 812 for formulating a material (e.g., a mixture of materials), an extrusion block 816 for extruding the formulated material, a formation block 820 for forming a cable that can be an armored cable and a utilization block 824 for utilizing the formed cable. Such a method may be utilized to form a cable such as the cable 700 (e.g., or the cable 701 or the cable 702) of FIG. 7.

In the example of FIG. 8, a provision block may be included where a pre-formulated material is provided in a form that may be fed to an extruder to perform the extruding of the extrusion block 816. For example, the formulating of the formulation block 812 may be performed wholly or in part by a supplier that can supply a wholly formulated material and/or a partially formulated material. As an example, formulating may occur (e.g., wholly or in part) at an extruder site where, for example, materials are mixed prior to introduction to an extruder feeder bin.

As an example, one or more polymeric materials may be provided in a pelletized form that can be held in a bin of an extruder, which may be, for example, a single or multiple screw extruder. A pelletized material or pelletized materials can be heated and deformed via extrusion (e.g., upon exposure to extrusion heat and pressure). An extruder can force material through a die or dies. As an example, a die may provide for extruding material in a substantially tubular shape about a lead (Pb) barrier layer. In such an example, the tubular shape may be of a circular cross-section (see, e.g., the cable 700), a pie shaped cross-section (see, e.g., the cable 701 and the cable 702) or one or more other types of cross-sectional shapes.

In the example of FIG. 8, the formulation block 812 can formulate the material through use of one or more polymeric materials (e.g., polyethylene and optionally, additionally polypropylene) and one or more additional materials such as, for example, one or more fillers and/or one or more curatives. As an example, a filler can be or include talc. As an example, a filler can be or include carbon black. As an example, a curative can be or include a crosslinking agent (CL agent). As an example, a crosslinking agent can help to facilitate crosslinking of polyethylene to form a crosslinked polyethylene (XLPE). As an example, the material of the formulation block 812 can include polyethylene in a form that is not crosslinked and/or partially crosslinked. As an example, in the method 810 of FIG. 8, crosslinking of polyethylene can occur to some amount (e.g., a desired amount) post extrusion per the extrusion block 816. For example, during the formation of the cable per the formation block 820 and/or during the utilization of the cable per the utilization block 824, some amount of crosslinking may occur. As an example, some amount of crosslinking may occur during storage, during transportation, during deployment in a well, etc.

As an example, one or more additives can be included in a polymeric material. As an example, a catalyst can be an additive. As an example, an antioxidant can be an additive. As an example, an amount of carbon black can be an additive (e.g., about 0.01 to about 1 percent by weight). As an example, carbon black and/or one or more other materials may help to protect against UV and/or other radiation. As an example, carbon black can make a crosslinked polyethylene cushion layer more opaque and of a color that tends to be consistent.

As an example, a colorant may be an additive. For example, one or more colorants may be utilized for a cable or cables. As an example, a multiphase cable can include colorants such that one or more of the phases (e.g., phase assemblies) differs in color. For example, consider a three phase cable that includes phase assemblies where each cushion layer of a respective phase assembly is colored differently to identify the corresponding phase (e.g., red, white, black, green, etc.). In such an example, the colored phases (e.g., phase assemblies) can be more readily spliced, connected, etc. (e.g., noting that a cable can be of the order of 100 meters or more, including of the order of 1000 meters or more).

As an example, an armoring process or armoring can include wrapping galvanized armor or stainless steel about one or more assemblies, which can be or include phase assemblies. As an example, an assembly or assemblies can be encased in a metallic tube (e.g., swaged metallic tube, metallic conduit, etc.).

Figure 9:
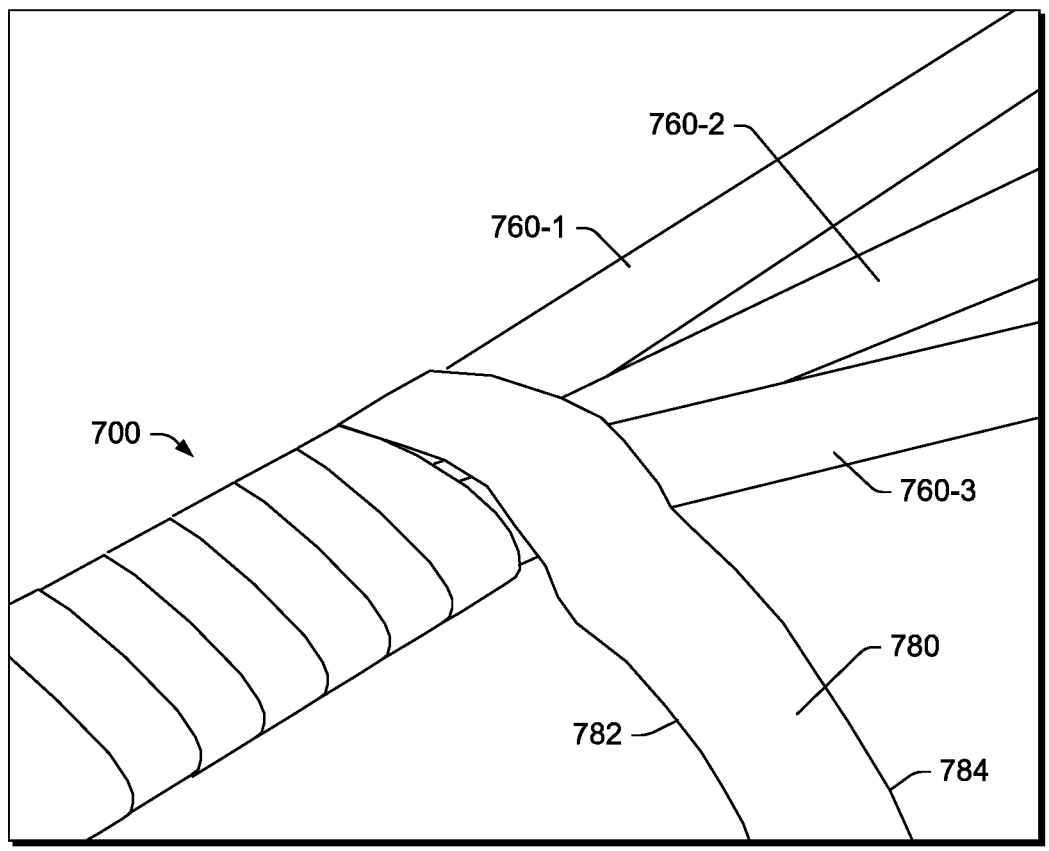
FIG. 9 illustrates an example of an armoring process for armoring assemblies as an armored cable.

FIG. 9 shows an example of the cable 700 during an armoring process where a strip of armor 780 is being applied over an assembly that includes three insulated and barrier layer protected conductors where each includes a cushion layer 760-1, 760-2 and 760-3. In the example of FIG. 9, the cushion layers 760-1 and 760-3 are surrounded to a greater extent by the armor 780 than the cushion layer 760-2, which is shown to be an intermediate component of the assembly while the cushion layers 760-1 and 760-3 are shown to be end or side components of the assembly that is being armored.

In the example of FIG. 9, the armor 780 includes edges 782 and 784 where the edge 782 may be an exposed edge and where the edge 784 may be a covered edge where the armoring process spirals the armor 780 with overlap. Parameters of an armoring process can include force, pitch and overlap as well as, for example, speed. In the example of FIG. 9, the edge 784 can be in direct contact with the cushion layers 760-1, 760-2 and 760-3 where bending may occur of the armor 780 with force against one or more of the layers 760-1, 760-2 and 760-3 where the layers 760-1 and 760-3 may receive a greater amount of the force than the layer 760-2. Thus, indentation risk can be greater for the layers 760-1 and 760-3, which can be considered the outermost layers.

Figure 10:
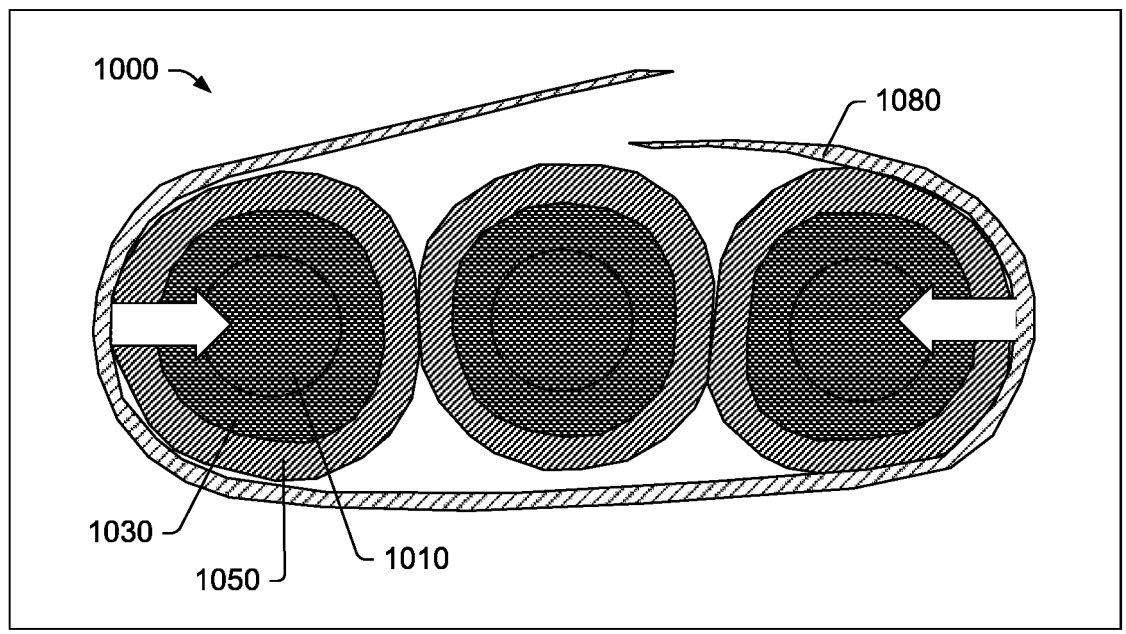
FIG. 10 illustrates examples of cables.
Figure 10:
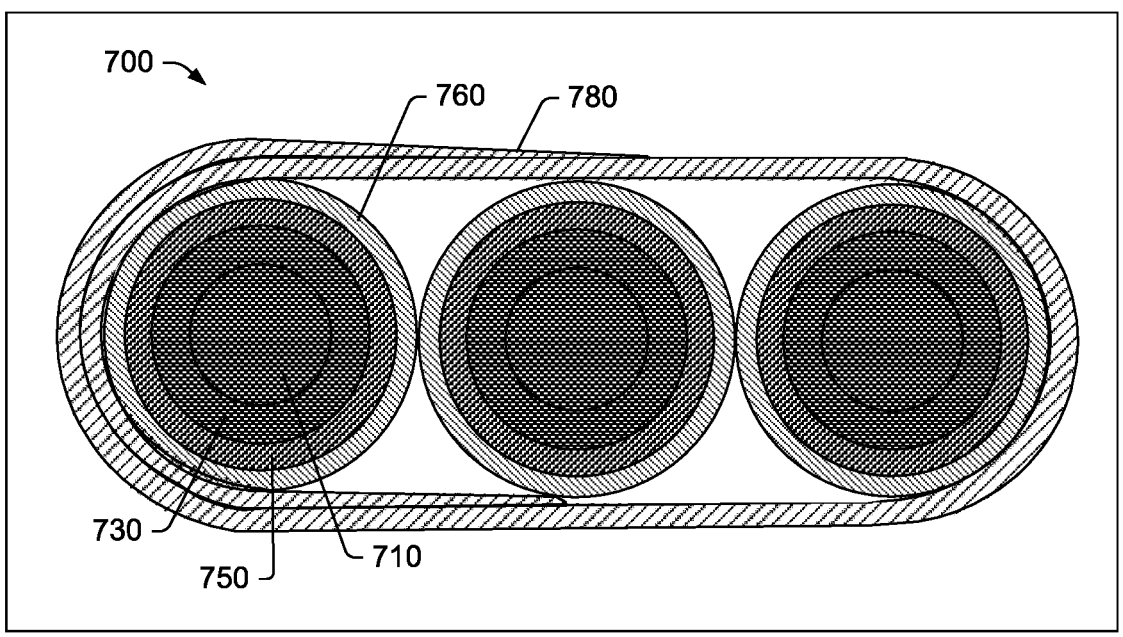

FIG. 10 shows an example of a cable 1000 that does not include an extruded cushion layer and shows an example of the cable 700 that includes the extruded cushion layer 760.

As shown in FIG. 10, the cable 1000 includes a conductor 1010, insulation 1030, a lead (Pb) barrier layer 1050 and armor 1080. Arrows in FIG. 10 represent force as may be applied during an armoring process. Such force may cause the lead (Pb) barrier layer 1050 to compress in one direction and expand in a substantially orthogonal direction. In such an example, the expansion may cause the cable 1000 to bulge such that the armor 1080 separates. In the example of FIG. 10, the end assemblies form somewhat "D" shapes (e.g., one being a backward "D") while the middle or intermediate assembly forms a somewhat elongated "0" shape. In such an example, the respective lead (Pb) barrier layers of the assemblies (see, e.g., the lead (Pb) barrier layer 1050) become distorted accompanied by some loss of symmetry.

As to the cable 700, the cushion layer 760 can help to maintain integrity of the lead (Pb) barrier layer 750, for each of the assemblies. Such an approach can, for example, help reduce risk of bulging due to deformation of lead (Pb) and thereby help to maintain the integrity of the armor 780. A more symmetrical cable may also perform better than a cable where each conductor has deformed lead (Pb) thereabout where the amount of deformation of lead (Pb) can differ for one or more of the conductors.

Figure 11:
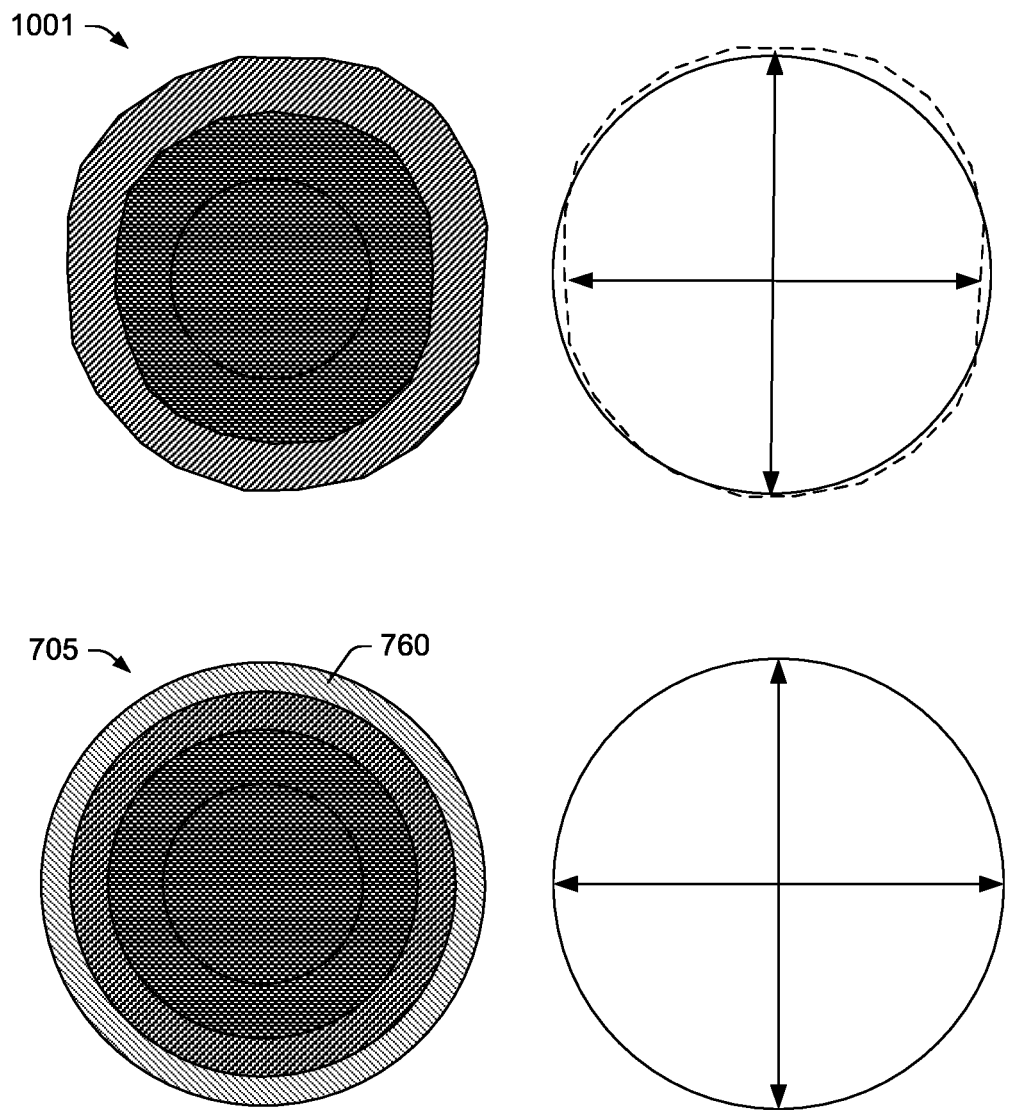
FIG. 11 illustrates examples of assemblies of the cables of FIG. 10.

FIG. 11 shows example graphics as to some amount of compression and extension of an assembly 1001 without a cushion layer compared to less compression and extension of an assembly 705 with a cushion layer 760. As indicated in FIG. 11, one or more dimensions and/or shapes may be utilized to characterize an amount of deformation of an assembly, particularly an amount of deformation of a lead (Pb) barrier layer of an assembly.

Figure 12:
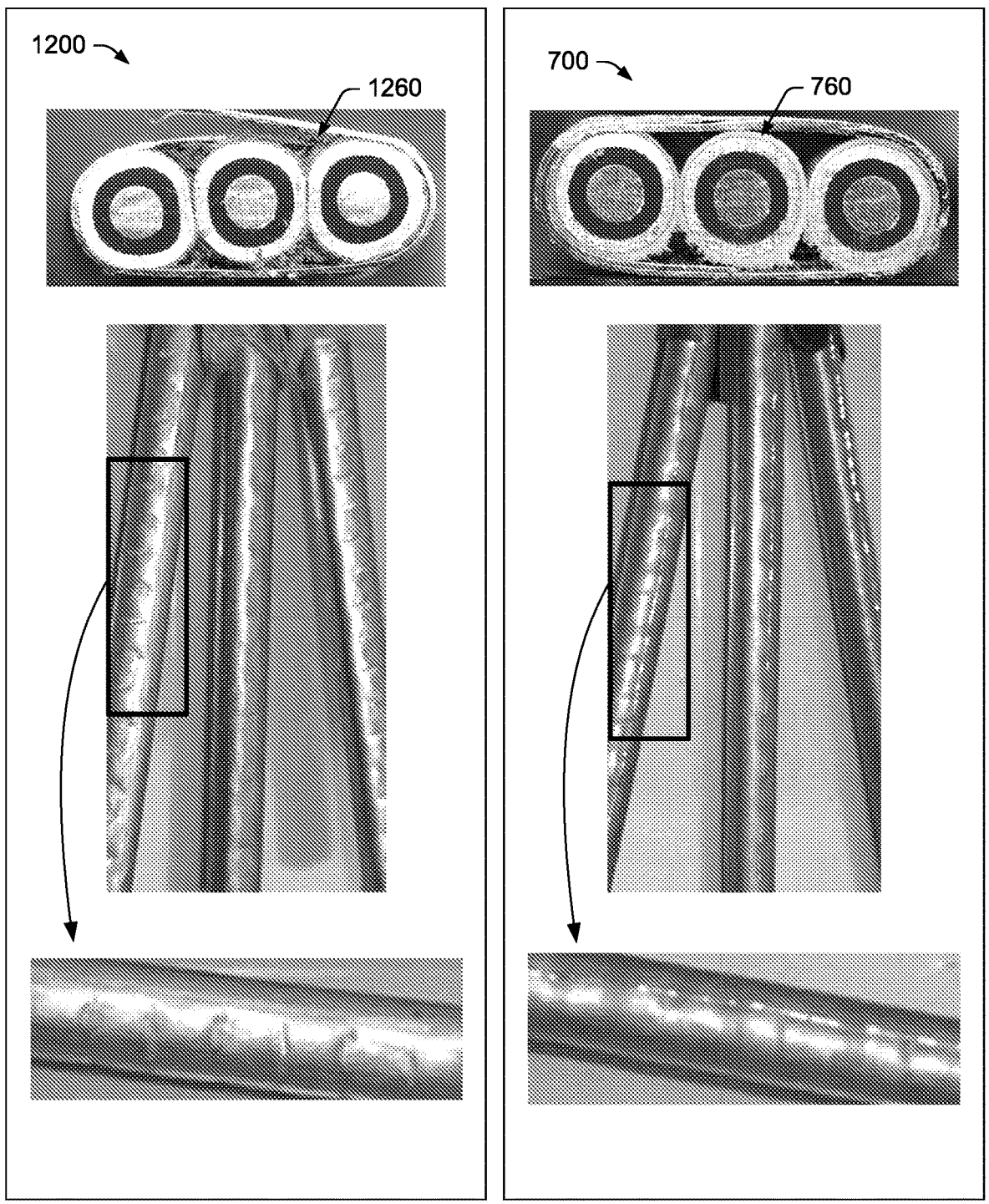
FIG. 12 are photographs of cables and assemblies.

FIG. 12 shows a series of photographs for two different cables 1200 (left) and 700 (right). The cable 1200 includes braided fibers 1260 while the cable 700 includes the cushion layer 760. In FIG. 12, the braided fibers 1260 (e.g., or braided layer) is made of polyethylene terephthalate (PET) fibers; while the cushion layer 760 is made of a crosslinked polymeric material, specifically including crosslinked polyethylene (XLPE).

PET is a thermoplastic polymer resin of the polyester family. PET fibers are utilized to make carpeting. PET has a density of about 1.38 g/cm$^3$. XLPE can have a lesser density, for example, XLPE can have a density that is less than about 1 g/cm$^3$. Lead (Pb), at ambient temperature, can have a density that is approximately 11.34 g/cm$^3$. As an example, through use of XLPE, weight of a power cable may be reduced and, for example, through an XLPE layer's ability to protect one or more lead (Pb) barrier layers, use of XLPE can allow for a reduced amount of lead (Pb) in such one or more lead (Pb) barrier layers, which can further reduce the weight of a power cable. As a power cable may be greater than 100 meters in length, or greater than 1,000 meters in length, reductions in a cross-sectional thickness of lead (Pb) can allow for substantial reduction in weight, which, in turn, can facilitate production, transport, deployment, retrieval, etc. Further, a reduction in an amount of lead (Pb) can be environmentally favorable as well. Yet further, a reduction in weight (e.g., mass) of a power cable can reduce momentum for a given velocity, which can translate into lesser impact force if the power cable contacts itself and/or one or more other objects (e.g., during transport, deployment, use, retrieval, etc.). The cable 700 may be constructed as a reduced weight cable when compared to the cable 1200.

Referring again to FIG. 12, when the armor and braided fibers 1260 are removed from the cable 1200 and the armor and cushion layer 760 are removed from the cable 700, it is possible to inspect the amount (e.g., shape, size, etc.) of deformation imparted to the lead (Pb) barrier layer of the cable 1200 and to the lead (Pb) barrier layer of the cable 700.

As shown in FIG. 12, the cable 700 with the cushion layer 760 lacks the sharp, cut-like indentations of the cable 1200 with the braided fibers 1260. In the photographs associated with the cable 700, a relatively straight, longitudinal line is an artefact from a knife used to cut the cushion layer 760 for its removal to expose the lead (Pb) barrier layer. Ignoring the knife cut, the difference is substantial between the two approaches. For example, indentations in the lead (Pb) barrier layer for the cable 700 do not include sharp edges from an armoring process as shown for the cable 1200. Further, the shapes of the lead (Pb) barrier layers for the cable 700 are substantially circular as originally assembled prior to the armoring process; whereas, for the cable 1200, the shapes are distorted.

As an example, a cable that includes cushion layers may be made to be flatter than a cable that does not include such cushion layers. As shown in FIG. 12, the cable 700 is flatter than the cable 1200 because the cable 1200 has bulged in the center due to force that has distorted lead (Pb) barrier layers of the cable 1200. A flatter cable can sit better on a reel, as well as, for example, provide a more standard and better clearance during installation and once installed. As to a reel, a reel can be a cylindrical structure (e.g., a cylinder) having a diameter and an axial length onto which cable can be wound where the cable is wound flat to a surface of the cylinder. A reel may be referred to as a spool. A reel can be rotated to take-up and/or to deploy cable. During such procedures, cable contacts itself (e.g., armor to armor). Cable closer to a center (e.g., rotational axis) of a reel can be under force where such force may cause one or more edges of armor to dig-in. As explained, use of one or more cushion layers can help to reduce damage to one or more lead (Pb) barrier layers as to digging-in of one or more edges of armor.

As to high temperature performance, the cable 700 of FIG. 12 can exhibit improved high temperature performance when compared to the cable 1200 of FIG. 12. For example, as the extruded cushion layer 760 can be thicker than the braided layer 1260, the extruded cushion layer 760 can allow for more room for thermal expansion, which can help to prevent lead (Pb) from deforming at high temperatures.

As to manufacturing, the cable 700 of FIG. 12 can exhibit improved manufacturing when compared to the cable 1200 of FIG. 12. For example, the braided layer 1260 can be applied at approximately 18 to 20 feet per minute (e.g., approximately 5.5 to approximately 6.1 meters per minute) while a high speed tape wrapping machine can process a cable at approximately 100 to 200 feet per minute (e.g., approximately 30.5 to approximately 61 meters per minute). A thermoplastic extrusion can be performed at an almost unlimited speed depending on the size of the equipment used and the specifications of the process. As an example, for the cable 700 of FIG. 12, the cushion layer 760 can be extruded at an extrusion speed that is in a range from approximately 200 to approximately 800 feet per minute (e.g., approximately 61 to approximately 244 meters per minute). As mentioned, a cable may be manufactured to be over a kilometer in length. Where a cable is to be a kilometer in length, a limiting rate of 6 meters per minute translates to approximately 167 minutes; whereas, a limiting rate of 61 meters per minute translates to approximately 16.3 minutes; noting that extrusion can be in excess of approximately 61 meters per minute.

As to material cost, the cable 700 of FIG. 12 can exhibit lesser material cost when compared to the cable 1200 of FIG. 12. As extrusion can utilize a raw base polymer, the cost of buying a resin that has been formed into a fiber or tape can be avoided, as the resin can be purchased in raw material pellet form for a lowest possible material cost. Additionally, low cost fillers or additives can be compounded into a cushion layer material to further reduce material cost. Some examples of low cost fillers include talc, clays, carbon blacks, cellulose, or other low cost fillers, resins or polymers.

As to materials for an extruded cushion layer (e.g., a solid extruded cushion layer), as an example, a polyethylene based compound may be utilized. For example, either a low density (LDPE) or high density (HDPE) base polymer can be used and may be selected according to one or more factors.

As to LDPE, its flexibility is advantageous for absorbing armor wrapping impacts; whereas, the high stiffness of HDPE is advantageous for maintaining high hoop strength and round conductor shape. As an example, a cushion layer can be characterized at least in part by hoop strength. As explained, braid can be of a very low hoop strength due to the nature of the individual fibers and their orientations that make up the braid. In contrast, an extruded polymeric layer can be formed to have a hoop strength that may be tailored by one or more factors such as wall thickness, HDPE content, etc.

As an example, a cushion layer can include material that can be crosslinked post-extrusion. As an example, crosslinking can involve chemically reacting polyethylene polymer in a way to induce permanent chemical bonding between polymer chains. Such crosslinking can be utilized to help maximize the thermal stability, fluid resistance, and mechanical robustness of the polymeric material.

As to crosslinking, consider the following three approaches as a few examples: silane cure system, continuous vulcanization and electron beam crosslinking.

As to a silane cure system, in this example a polyethylene master batch can be grafted with silane groups that are combined with a catalyst in an extruder. Once combined and extruded, the solid polymer cushion will slowly crosslink. The crosslinking rate in this case can be controlled by ambient humidity and temperature with a time to full cure being of the order of a week or more (e.g., consider one to about 5 weeks). Such a silane cure system can be employed without an additional crosslinking process.

As to continuous vulcanization (CV), polyethylene material can include a peroxide component that generates free radicals, initiating chain-to-chain crosslinking. In order to introduce enough heat to fully activate the peroxide curative, after extrusion an assembly can be sent through a high pressure steam or hot nitrogen containing tube. The tube can be of sufficient temperature (e.g., >150 degrees C.) and sufficient length (e.g., >50 m) to achieve a relatively complete reaction of the peroxide. Such an approach can achieve relatively complete crosslinking in a single pass. However, line speeds may be slower than with one or more other approaches (e.g., to allow cure to complete). And, added costs may be associated with maintaining a high temperature steam (or hot air) tube and/or boilers or nitrogen generators that would feed it.

As to electron beam crosslinking (E-beam crosslinking or EBC), such a processes utilized a focused electron beam that can remove hydrogens from a main polymer chain to create free radicals that can initiate crosslinking. E-beam crosslinking can be implemented without additional heat and as such tends to be relatively rapid; noting that costs are associated with E-beam equipment.

As an example, a cushion layer can be formed of a crosslinked polyethylene (XLPE) polymer system, which may optionally be compounded with one or more other polymers, fillers, etc.

As an example, stiffness of XLPE can be improved by compounding with mineral or carbon fillers and/or with higher stiffness polyolefins (such as a polypropylene homopolymer). Filler or additive selection can be accomplished in a manner that aims to minimize loss of effectiveness of a crosslinking reaction.

As an example, a cable that includes a cushion layer may optionally include a thinner lead (Pb) barrier layer than a cable that utilized PET fibers for a braided layer. As mentioned, XLPE can have a density less than PET. Where a lead (Pb) barrier layer thickness can be reduced for one or more assemblies (e.g., conductor assemblies), a reduction in mass of a cable may be achieved in comparison to a braided layer approach.

As an example, a cable and/or cable materials can be tested by exposure to brine (e.g., from about 1 percent to about 5 percent salt in water), which may approximate seawater or other types of saline environments. Such tests can be at one or more temperatures and/or at one or more pressures. As an example, a test may be conducted in a pressure vessel that includes brine where at least a portion of a cable and/or one or more cable materials may be submersed in the brine.

An ESP cable that included the aforementioned PET braided material was subject to brine in a pressure vessel for a period of days (e.g., 7 days in a pressure vessel at 240 degrees C.). Under such conditions, the braided material was degraded and lead (Pb) layers fused together and in some locations thinned to an extent that would lead to failure (e.g., as a barrier layer) in a relatively short period of time. Further, armor indentations on the lead (Pb) were visible, including indentations with sharp edges; noting that such sharp edges can promote crevice corrosion.

As to crevice corrosion, a crevice can develop a local chemistry that differs from that of a bulk fluid. In a neutral pH solution, the pH at a crevice can drop thereby creating an acidic environment that can accelerate corrosion. For a given crevice type, chemical composition of electrolyte in the crevice and potential drop into the crevice can be factors that affect rate of corrosion.

An ESP cable that included an XLPE cushion layer was similarly subjected to brine in a pressure vessel for a period of days (e.g., 7 days in pressure vessel at 240 degrees C.). Under such conditions, the XLPE cushion layer remained in place. After removing the XLPE cushion layer, the lead (Pb) layer was in acceptable condition, with an acceptable shape, relatively smooth surface and without substantial dents or cuts (e.g., from thermal expansion).

As an example, an ESP cable can include an extruded cushion layer that can be formed of a solid polymeric material such as cross-linked polyethylene (XPLE). In such an example, through use of the cushion layer, a reduction can be made in the specifications as to a lead (Pb) wall thickness, which can lead to a decrease in cable cost and weight. Such a reduction in the lead (Pb) wall is possible through improved damage protection provided by an extruded cushion material that is exterior to the lead (Pb) wall. As mentioned, an ESP cable that includes a cushion layer may allow for lower cost, higher processing speed, and improved performance.

As mentioned, ESP cables can be used in extreme high temperature, pressure, and harsh chemical environments (e.g., including corrosive liquids and gases). As mentioned, lead (Pb) sheathing can be used as a barrier material. Lead (Pb) exhibits good impermeability to moisture, corrosion resistance, and processability as a protective barrier layer. Such a layer can be made with a desired thickness to provide for a cable rated for use in particular conditions (e.g., per cable specifications).

For manufacturing specifications, lead (Pb) layer structural conditions such as creep and fatigue resistance as well as microstructural stability during the service life of a cable are factors for consideration. Additionally, as mentioned, a metal armoring process may cause deformation and/or fracturing of a lead (Pb) barrier layer.

As mentioned, a woven polyester braid layer (e.g., a PET fiber braided layer) may be applied on a lead (Pb) barrier as a protective caution against damage or deformation during an armoring process. However, as demonstrated, such a woven polyester braid can be unstable under high temperature and pressure and will likely be nearly completely degraded within the first few weeks of cable service time. Such degradation results in the lead (Pb) coming into direct contacting with armor (e.g., with no protection therebetween).

Under some downhole conditions, high internal pressure can generate mechanical stresses on a lead (Pb) barrier layer that can lead to failure. Fatigue in the lead (Pb) barrier layer can be, at least in part, due to cyclic stress and strain as may be caused by vibration of a cable during operation (e.g., consider fluid and/or motor induced vibrations).

As an example, a power cable such as the cable 700 of FIG. 7 can be utilized with an electric submersible pumping system. Such a cable can include a conductor, an insulation layer over the conductor, a barrier layer atop the insulation layer, and a protective layer including XLPE over the barrier layer. Such a cable can be utilized as one or more of the one or more cables 211 shown in FIG. 2.

As explained, a cable can include one or more cushion layers for decreasing risk of lead (Pb) deformation. Such a cable can be, for example, a flat ESP cable. As an example, one or more cushion layers can reduce risk of lead (Pb) deformation during an armoring process. In such an example, the one or more cushion layers can be made by extrusion of XLPE (e.g., XPLE thermoset material).

As an example, an XLPE material can include talc to provide more thermal and chemical stability to uncured XLPE at high temperatures.

Talc or talcum is a clay mineral composed of hydrated magnesium silicate, for example, consider one or more of the chemical formula $H_2Mg_3(SiO_3)_4$ or $Mg_3Si_4O_{10}(OH)_2$. Mohs scale of mineral hardness, based on scratch hardness comparison, defines value 1 as the hardness of talc. As such, talc can be scratched by a fingernail. Talc can have a specific gravity of approximately 2.5 to approximately 2.8, a clear or dusty luster, and be in a range from translucent to opaque. Talc is not soluble in water, but is slightly soluble in dilute mineral acids. Its color ranges from white to grey or green.

As an example, a formulation can include polymeric material such as crosslinkable polyethylene and a carbon-based material such as carbon black. Such a carbon-based material can impart a darker color to polyethylene (e.g., crosslinked polyethylene).

XLPE is a crosslinked polyethylene with acceptable mechanical, thermal, and dielectric properties. XLPE may be crosslinked after an extrusion process by way of exposure to hot water or steam with the aid of a catalyst (e.g., or via one or more other mechanisms). As to water or steam in crosslinking, moisture leads to hydrolysis of alkoxy groups of silane group followed by condensation to form stable siloxane linkages (the crosslinks). As an example, a crosslinking process may be carried out in solid shaped polymer rather than in melt. A crosslinking process can be relatively slow, for example, consider conditions of at least 8 hours in hot water or steam at 80 degrees C. or up to five weeks at room temperature. Extruded XLPE may tend to have a low crosslink density, as such, the XLPE may exhibit low chemical compatibility compared to fully cured XLPE (e.g., more highly crosslinked XLPE). As an example, a production process may be considered a rapid production process, which may, for example, positively influence crosslink density of XLPE. As an example, consider a rapid production process that includes extrusion where the high speed of the melt extrusion of an XLPE layer can accelerate crosslinking by allowing for rapid quenching of the melt extruded XLPE layer in hot water, which, consequently, can achieve a high crosslink reaction rate. In such an example, the crosslink reaction rate can be determined by thickness of the XLPE layer, speed of extrusion of the XLPE layer and temperatures. A method can include controlling a production process as to one or more of such parameters to achieve a desired amount of crosslinking (e.g., crosslink density of XLPE), for example, at a certain time during production of a power cable, which may have a positive influence on one or more subsequent processes of the production process for the power cable (e.g., consider lessening risk of deformation during armoring of the power cable).

Figure 13:
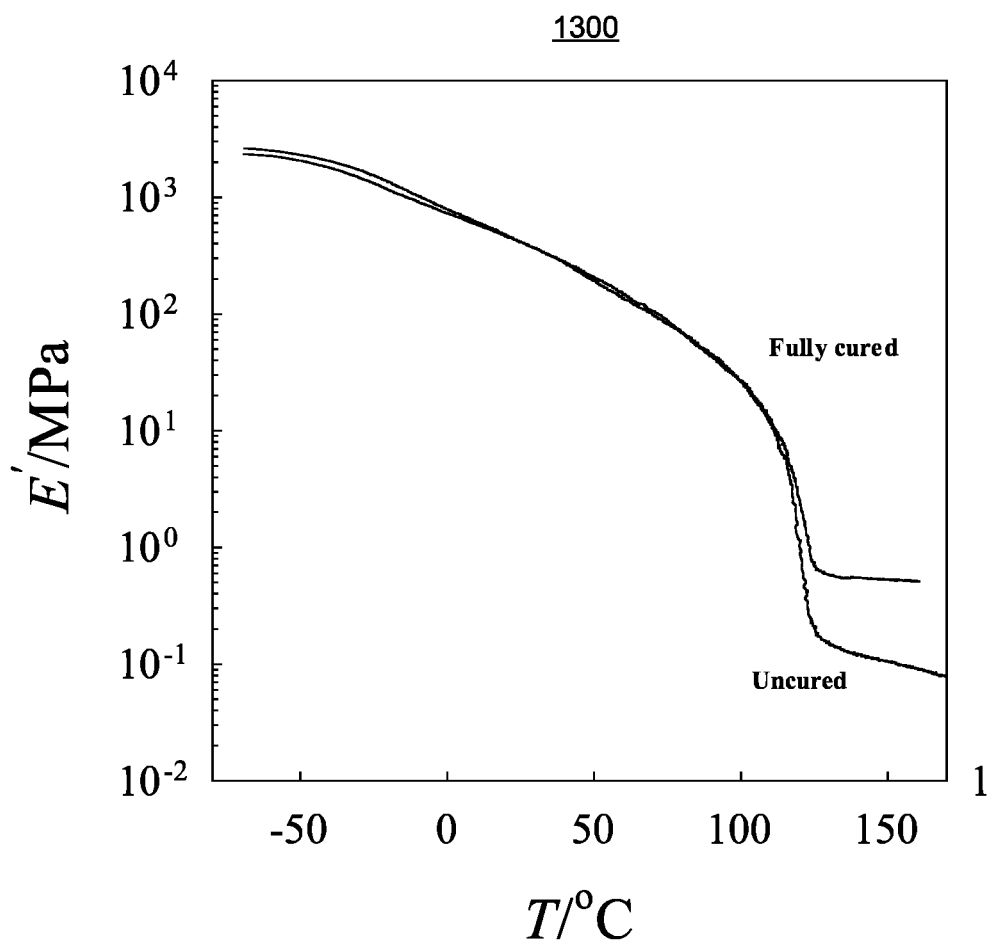
FIG. 13 illustrates an example of a plot.

FIG. 13 shows a plot 1300 of storage modulus obtained from DMA measurements at different temperatures for both uncured and fully cured XLPE samples. In the example of FIG. 13, the XLPE is PolyOne SYNCURE™ S1054A (PolyOne Corporation) ("S1054A material").

The SYNCURE™ system is a two-step, silane-grafted, moisture cross-linkable high density polyethylene system (XLPE). Made by following the SIOPLAS E two-step technology, SYNCURE™ XLPE offers an alternative to organic peroxide, radiation and reactor copolymer crosslinking processes.

The S1054A material is available as a base resin and is moisture crosslinkable (e.g., moisture curable). The S1054A material has a density of approximately 0.9 $g/cm^3$ (ASTM D1505) and a tensile strength at break of about 17.2 MPa with an elongation at break of about 40 percent (hot creep elongation, SYV-40). The S1054A material is available as pellets (e.g., cube, cylindrical or other shape) that can be, for example, fed to an extruder. A system (e.g., a mixture) can include about 95 phr S1054A and about 5 phr S1000B (e.g., a catalyst batch component). As an example, a material can include silane, ethenyltrimethoxy-, which is also known as trimethoxyvinylsilane (e.g., from about 0.1 percent to about 10 percent).

The fully cured sample was prepared by immersing the extruded XLPE film into a hot water at 80 degrees C. for 12 hours. Both samples have substantially the same storage modulus in the temperature range from approximately −70 degrees C. up to approximately 115 degrees C. The value of storage modulus of the fully cured sample tends to be about one order of magnitude higher than that of uncured sample in the high temperature range, higher than the melting point of XLPE.

The value of the storage modulus above the melting point is a function of the crosslink density of the material. The data of the plot 1400 confirms that immersing the extruded XLPE film in water for approximately 12 hours at approximately 80 degrees C. is efficient for a fully curing process.

Chemical compatibility in well fluid, IRM-903 (e.g., a reference oil for testing pursuant to ASTM, etc.), was also tested where four dog bone shape samples were prepared for both uncured and fully cured XLPE and immersed in IRM-903 for approximately 70 hours at approximately 150 degrees C. The uncured XLPE swelled dramatically and the four dog bone shape samples diffused together, while the fully cured samples swelled slightly and still kept their dog bone shape.

Figure 14:
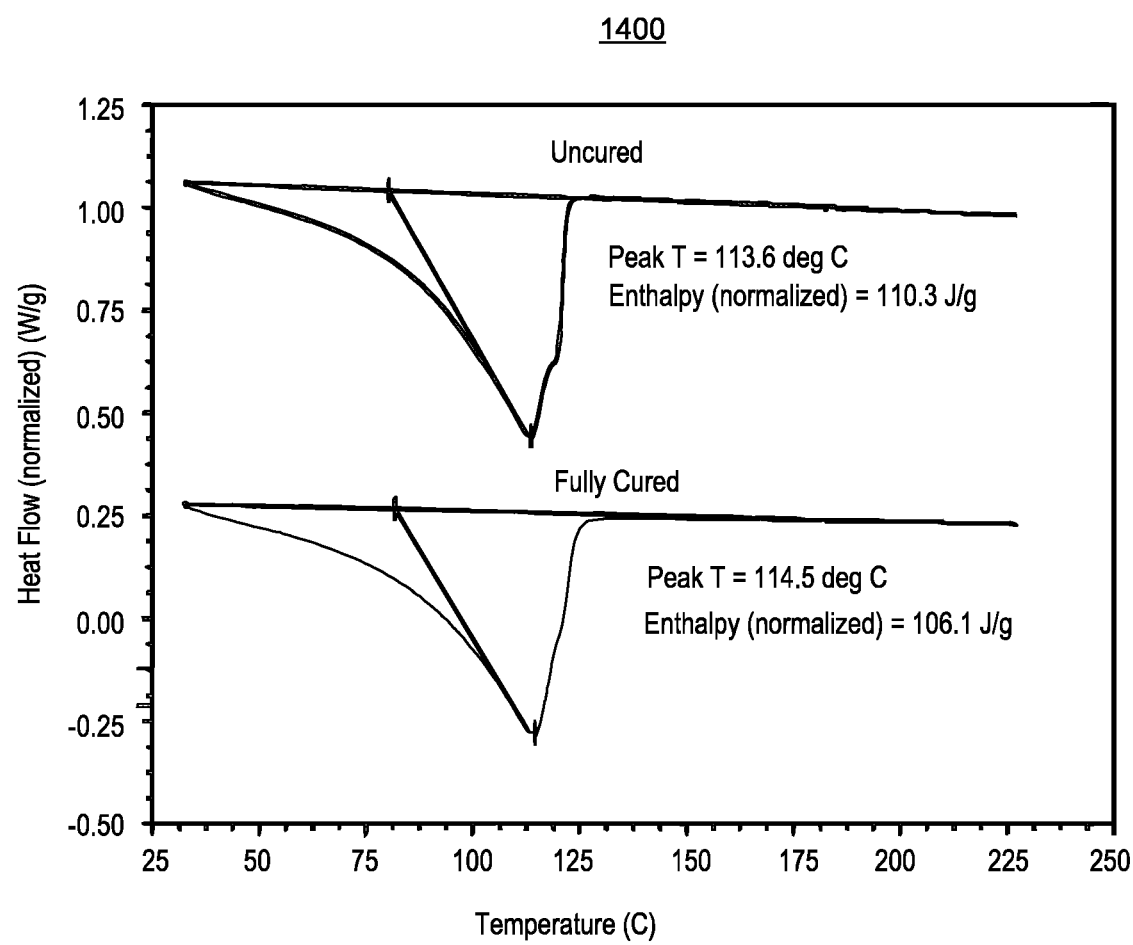
FIG. 14 illustrates an example of a plot.

FIG. 14 shows a plot 1400 as to melting point and melting enthalpy of XLPE. As shown in the plot 1400, the curing process has a slight effect on both the melting point and melting enthalpy of XLPE. Specifically, the melting point and melting enthalpy changed from approximately 113.6 degrees C. and 110.3 J/g for uncured sample to approximately 114.5 degrees C. and 106.1 J/g for fully cured sample, respectively.

Figure 15:
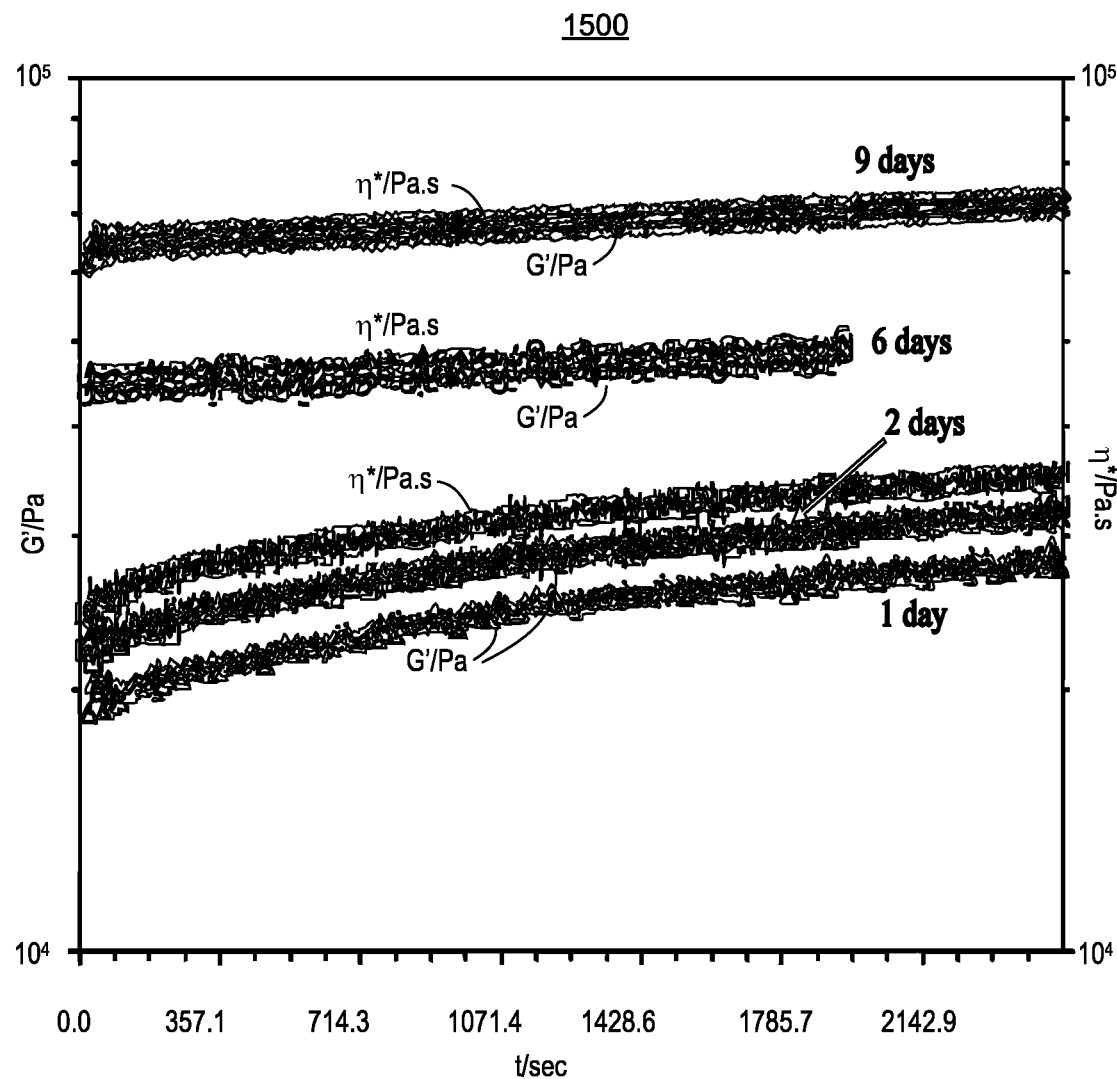
FIG. 15 illustrates an example of a plot.

As mentioned above the curing process of XLPE might take weeks at ambient condition. FIG. 15 shows a plot 1500 of the time dependence of elastic storage modulus (G') and complex viscosity ($\eta^*$) at approximately 170 degrees C. for uncured XLPE after annealing the sample at room temperature for different days. Both G' and $\eta^*$ increase systemically with increasing annealing time at room temperature—indicating that the curing process of XLPE is quite slow at room temperature but can nevertheless be accomplished at ambient conditions. As mentioned, various parameters of a production process can be tailored to increase the crosslinking rate to thereby achieve a desired amount of crosslinking (e.g., a desired crosslink density) of XLPE during the production process, which may help to protect a lead (Pb) barrier layer from one or more subsequent processes (e.g., armoring, rolling on a spool, etc.).

Figure 16:
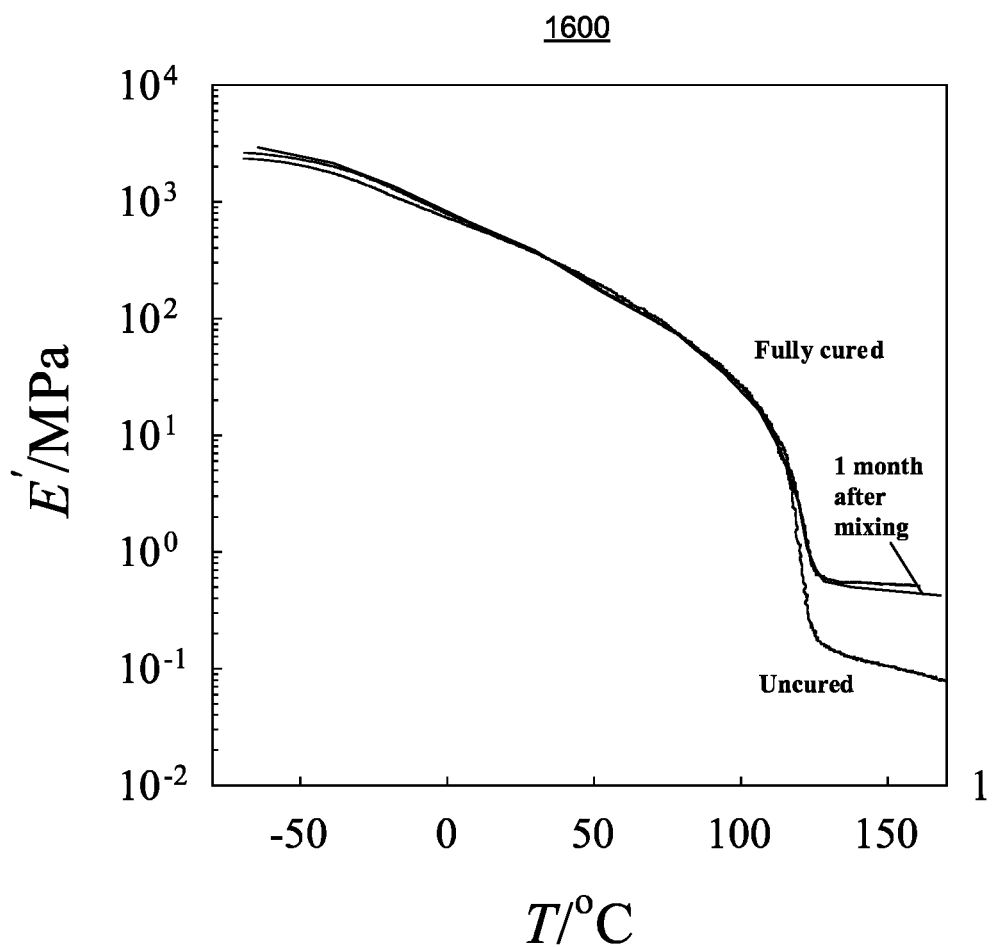
FIG. 16 illustrates an example of a plot.
Figure 17:
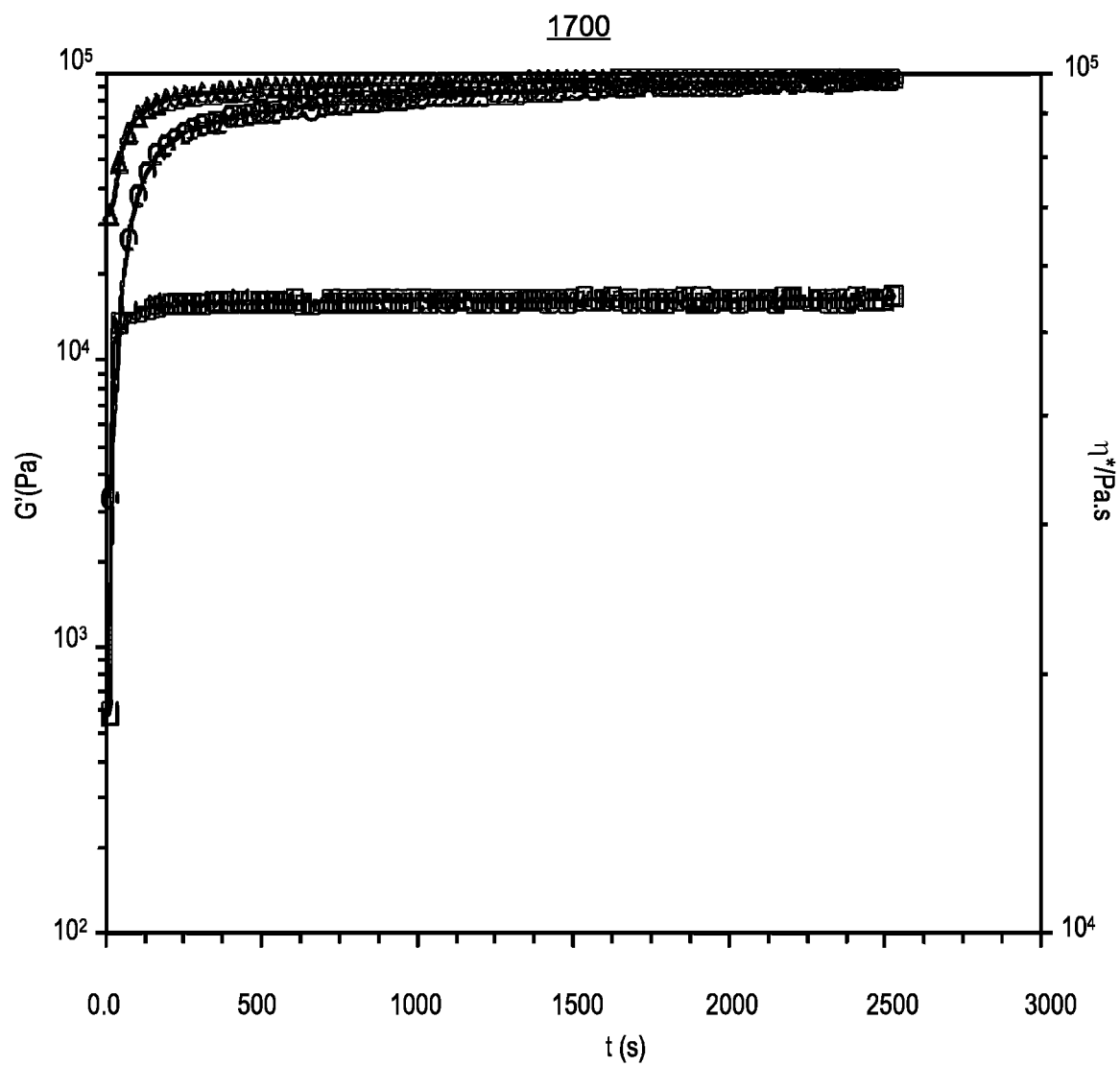
FIG. 17 illustrates an example of a plot.

FIGS. 16 and 17 show plots 1600 and 1700 as to post-annealing samples for one month at room temperature. Specifically, the plots 1600 and 1700 show DMA and rheology measurements as retested. Per the plot 1600, there is a plateau in the storage modulus at approximately 150 degrees C. for the sample annealed for one month at room temperature; a similar to that of the fully cured sample. The rheological data for the same sample (one month at room temperature) is shown in the plot 1700. As shown in the plot 1700 of FIG. 17, G', G" and $\eta^*$ reached relatively constant plateau values, and the G' is almost one order of magnitude higher than G" due to the formation of three dimensional elastic crosslink structure.

Given the foregoing data, XLPE annealing at ambient conditions is achieved in about one month and is achieved in hot water or steam for 12 hours at approximately 80 degrees C. (e.g., to complete the curing process).

As an example, a method can include making an XLPE material with a reasonable amount of crosslink density and/or adding one or more materials that can favorably interact with XLPE and form a compatible thermally stable composite with high chemical resistance.

As an example, adding polypropylene (PP) or PP with talc can improve the mechanical and thermal stability of an extruded XLPE material. Such an approach can be implemented optionally without heating the extruded material in hot water for hours.

PP has a higher melting point than XLPE, which can provide thermal stability at a temperature above the melting point of XLPE (e.g., above approximately 150 degrees C.) yet lower than the melting point of PP.

As an example, talc can be added to formulate an extrudable material that includes polyethylene where the talc can increase the material's stiffness and, for example, reduce deformation and diffusion between extruded layers at high temperature and pressure (see, e.g., the method 810 of FIG. 8).

Tests were performed for uncured XLPE and XLPE/PP blends with 25 and 50 wt % PP after the chemical compatibility tests in IRM 903 for approximately 70 hours at approximately 150 degrees C. Results demonstrate that PP can provide both thermal and chemical stability for uncured XLPE. The swelling percentage and diffusion of dog bone shape samples dramatically decreased by adding PP. The blend with 50 wt % PP showed better chemical compatibility and lower swelling than that of 25 wt % PP blend. Similar behavior was observed for XLPE/PP/Talc 75/15/10 and 50/30/20 composites.

Figure 18:
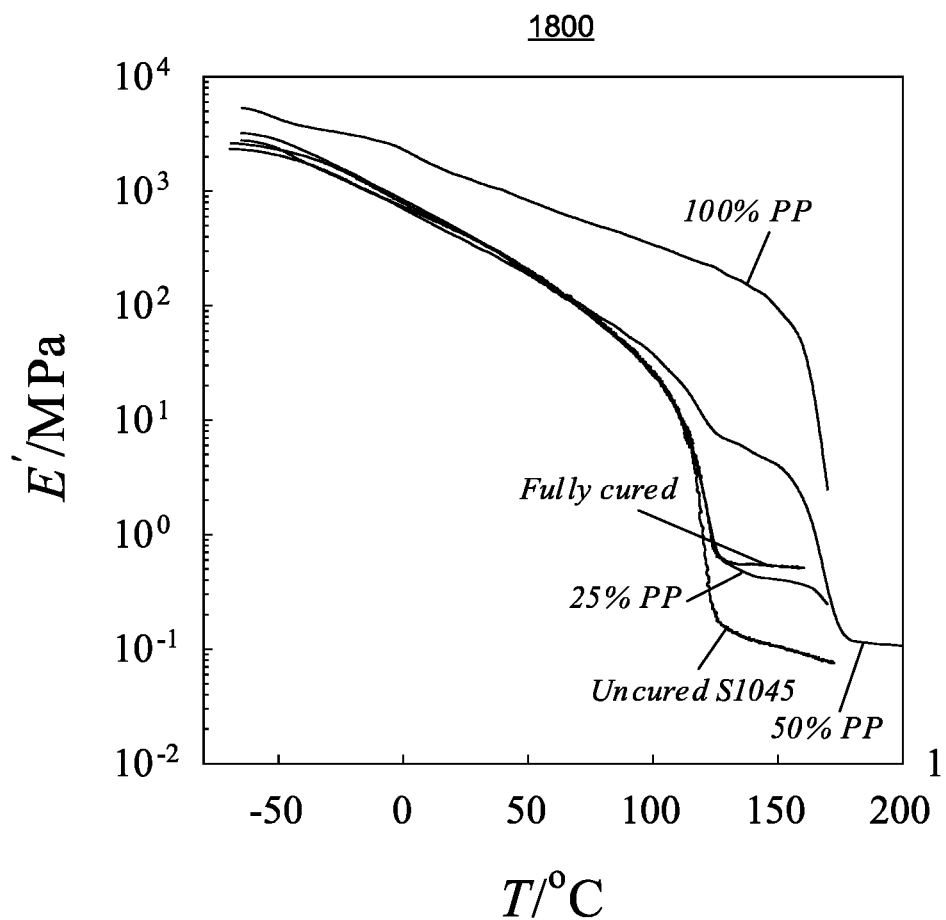
FIG. 18 illustrates an example of a plot.

Trials demonstrated that PP improved the thermal and chemical compatibility of uncured XLPE. FIG. 18 shows a plot 1800 of DMA measurements (storage modulus versus temperature) for uncured and fully cured pure XLPE as well as pure PP, uncured XLPE/PP 75/25 and uncured XLPE/PP 50/50 wt % blends.

In the plot 1800, the storage modulus of pure thermoplastic PP is much higher than both cured and uncured XLPE over the entire range of temperature. A dramatic decrease in the storage modulus of pure PP was observed at approximately 165 degrees C. due to the melting point of PP. Therefore the high melting point of PP compared to that of XLPE contributes to improvement in the thermal stability and chemical compatibility of uncured XLPE.

As shown in the plot 1800, the blend of XLPE/PP 75/25 wt % has a plateau storage modulus at 150 degrees C. that is similar in magnitude to that of fully cured XLPE; noting that the plateau storage modulus at 150 degrees C. of XLPE/PP 50/50 wt % is about one order of magnitude higher than that of fully cured XLPE.

Based on the DMA results, a blend XLPE with PP with at least approximately 25 wt % may substantially enhance the thermal stability and chemical compatibility of uncured XLPE. In such an approach, a process can optionally be implemented without curing of an extruded blend for 12 hours in hot water. Again, as demonstrated, pure thermoplastic PP has a very poor chemical compatibility at 150 degrees C. and the 4 dog bone shape samples almost dissolved in IRM 903.

Figure 19:
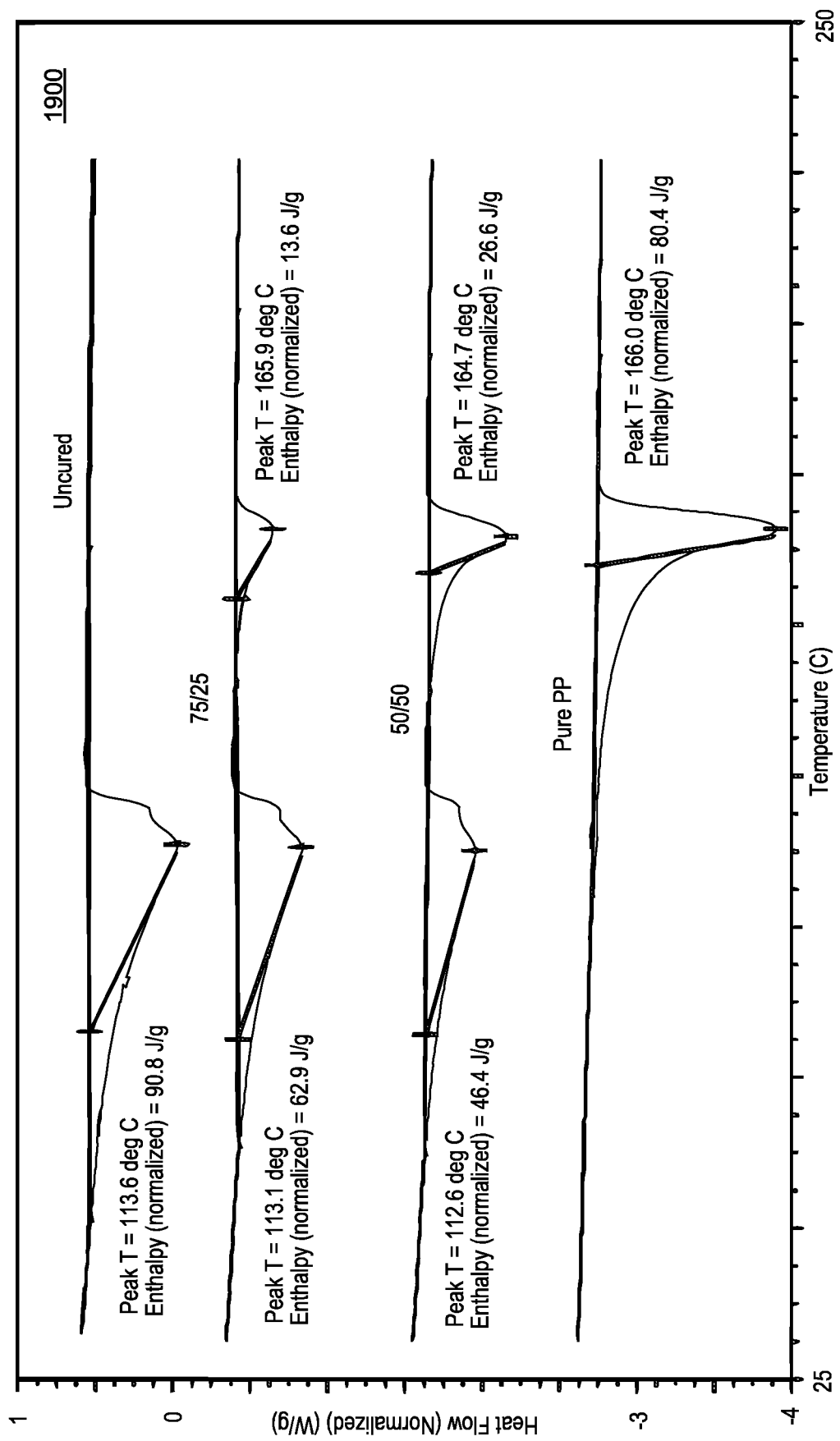
FIG. 19 illustrates an example of a plot.

FIG. 19 shows a plot 1900 for data from a second heating run for pure PP, uncured pure XLPE, and uncured blends of XLPE/PP 75/25 and XLPE/PP 50/50 wt %.

As shown in FIG. 19, the melting peak (Tm) and the melting enthalpy ($\Delta$Hm) of pure PP are approximately 166 degrees C. and 80.4 J/g, respectively; while the values of Tm and $\Delta$Hm for pure uncured XLPE are 113.6 degrees C. and 90.8 J/g, respectively. For XLPE/PP blends, the values of $\Delta$Hm for XLPE-phase and PP-phase are directly promotional with the concentration of each blend components. A slight decrease in the values of the Tm of each phase for the blend XLPE/pp 50/50, while no substantial change was observed in the Tm for XLPE/PP 75/25 blend. The DSC data confirmed that the blends are two-phases with little effect on the melting and crystallization behavior of each component.

Figure 20:
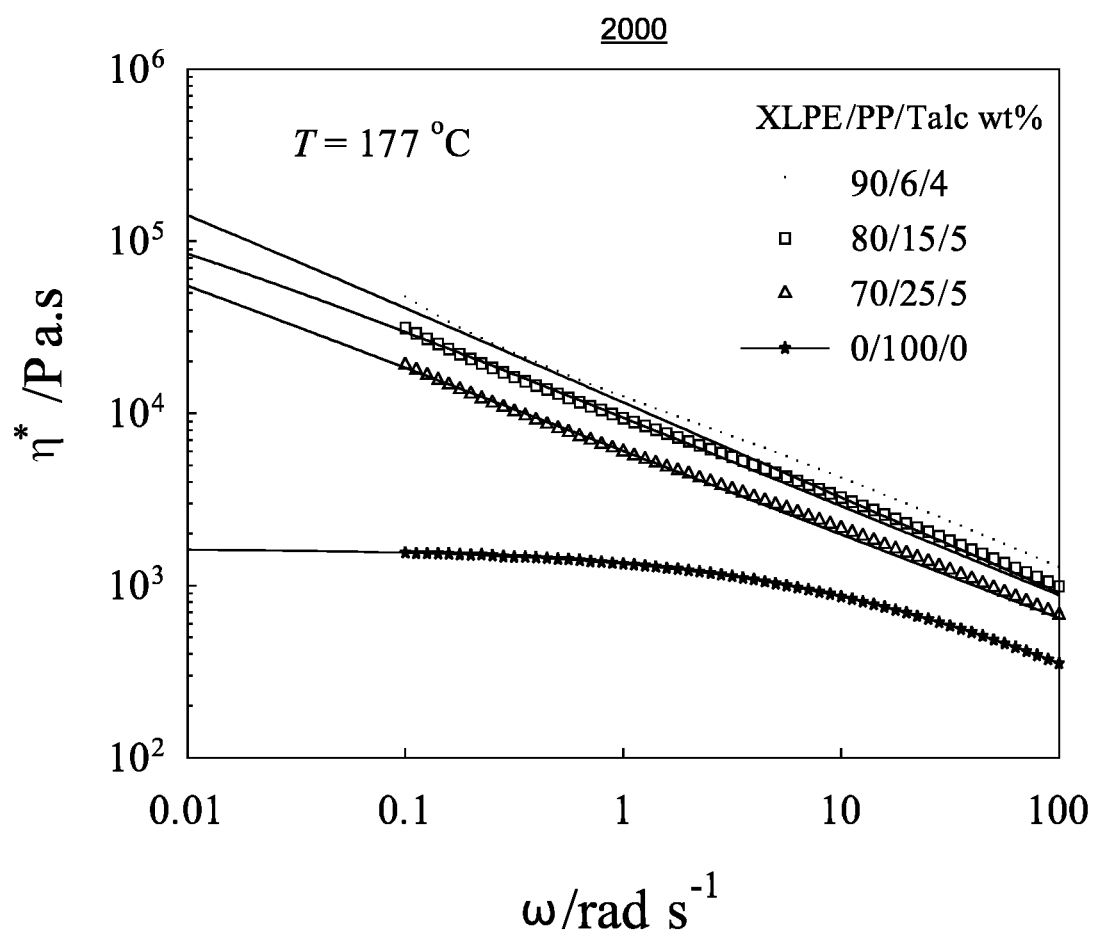
FIG. 20 illustrates an example of a plot.

The effect of PP and talc concentration on the melt viscosity was examined for control of processing conditions of XLPE/PP/Talc composites. FIG. 20 shows a plot 2000 of the class angular frequency dependence of complex viscosity for XLPE/PP/Talc with different concentrations at approximately 177 degrees C. (same as the processing temperature).

As shown in the plot 2000, the complex viscosity of the pure thermoplastic PP is much lower than that of the XLPE/PP/Talc composites. By maintaining the concentration of talc at approximately 5 wt %, the XLPE/PP/Talc composite viscosity systematically decreases with increasing the concentration of PP indicating that the XLPE/PP/Talc composites can be processed more easily than the pure XLPE under the same processing condition. In the plot 2100, symbols represent experimental data and the lines are calculated from a Cross Model (Eqn. 1):

$$\eta^* = \frac{\eta_0}{1 + \left(\frac{\omega}{\omega_c}\right)\beta}$$

where $\eta_0$ is zero shear viscosity, $\omega_c$ is critical shear frequency and $\beta$ is a material constant.

The XLPE/PP/Talc composites showed non-Newtonian behavior (shear thinning) over the entire range of angular frequency; while the pure PP exhibited Newtonian behavior at low angular frequency and shear thinning at high angular frequency range. The fully cured XLPE/PP/Talc composites may have better chemical compatibility and lower swelling/fluid uptake percentage than pure XLPE.

Trials were performed for the fully cured pure XLPE and fully cured XLPE/PP/Talc composites with different compositions after the chemical compatibility tests in IRM 903 at approximately 150 degrees C. for 70 hours. The results demonstrate that volume swell decreases systematically with increasing concentration of PP with keeping the talc concentration at approximately 5 wt %.

Figure 21:
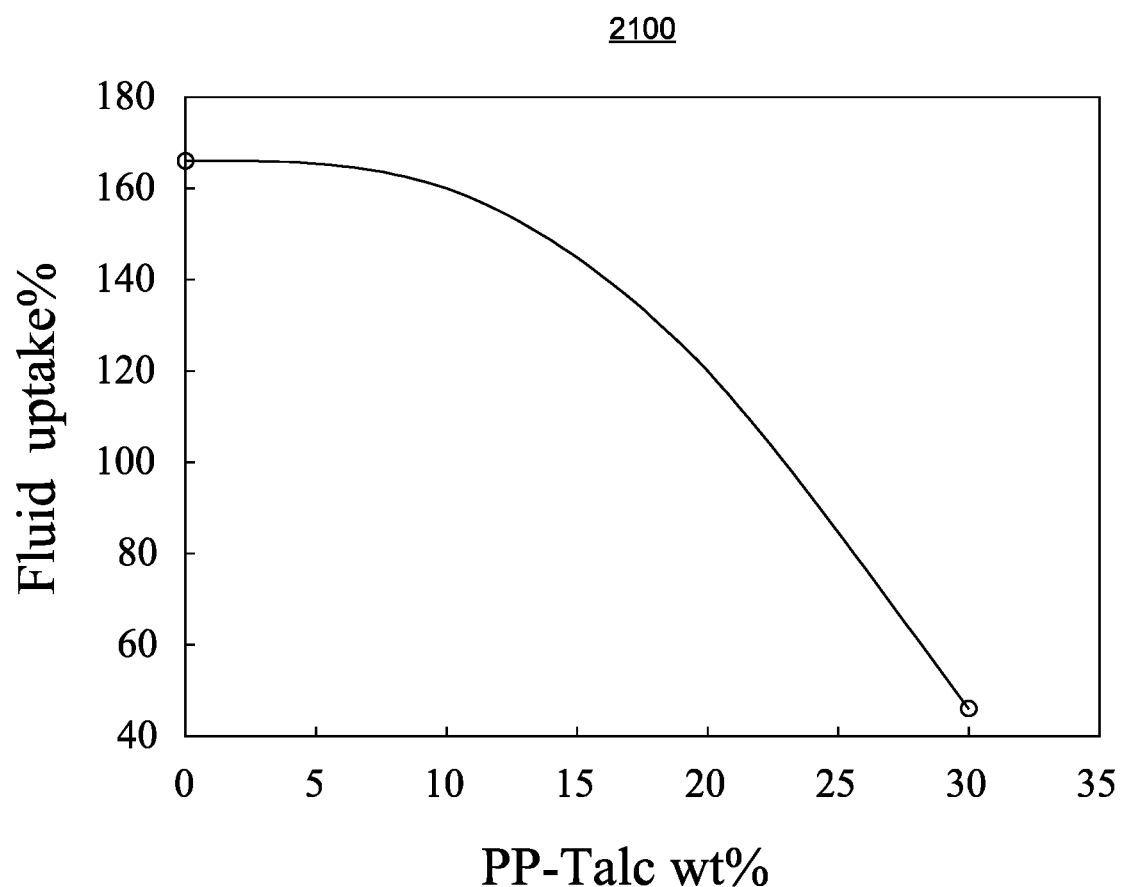
FIG. 21 illustrates an example of a plot.

FIG. 21 shows a plot 2100 as to fluid uptake percentage with respect to PP-talc wt %. As shown in the plot 2100, the fluid uptake percentage decreased slightly for XLPE/PP/Talc 90/6/4 wt % composite due to the low concentration of PP. Keeping the talc concentration constant at approximately 5 wt %, the fluid uptake percentage decreases strongly with increasing the PP concentration.

Figure 22:
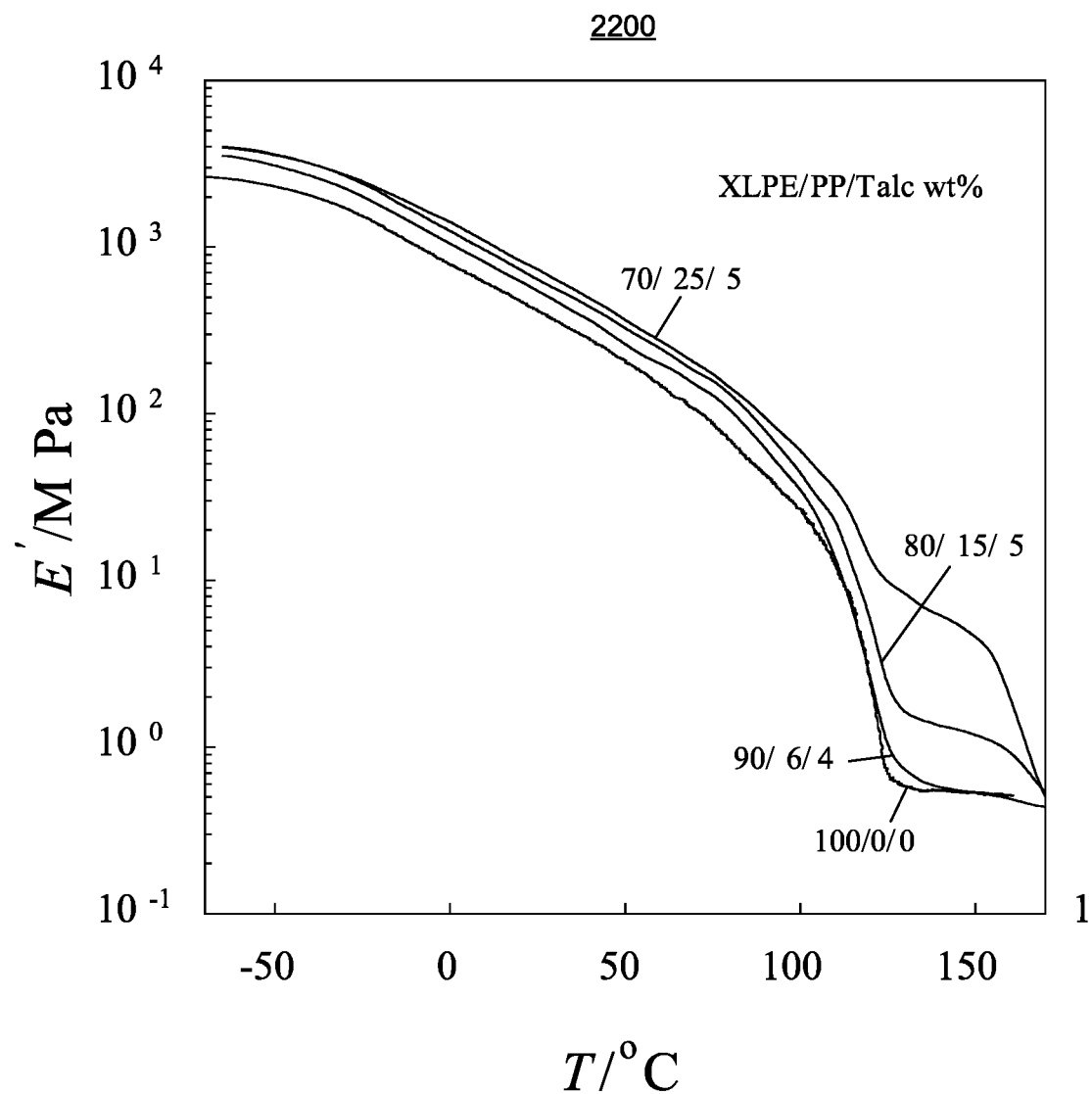
FIG. 22 illustrates an example of a plot.

FIG. 22 shows a plot 2200 of the effect of PP and talc on the plateau modulus of fully cured XLPE. As shown in the plot 2200, the plateau modulus of fully cured XLPE and XLPE/PP/Talc 90/6/4 wt % composite tend to be substantially the same; while the plateau modulus of XLPE/PP/Talc 80/15/5 and 70/25/5 wt % composites are much higher than that of fully cured XLPE. The crosslink density ($v_e$) of S1054A/PP/Talc composites can be determined from the rubbery moduli using the following equation, according to the kinetic theory of rubber elasticity (Eqn. 2):

$$v_e = \frac{E'}{3RT}$$

where E' is the storage modulus at $T_g$+50 degrees C. in the rubbery plateau, R is the gas constant, and T is the absolute temperature at $T_g$+50 degrees C.

Table 1 shows the values of crosslink density for fully cured samples calculated from Eqn. 2.

| XLPE/PP/Talc | Stress at break MPa | Modulus MPa | % Strain at break | CL Den. mol/m³ |
|---|---|---|---|---|
| 100/0/0 | 18.6 | 289 | 662 | 51.4 |
| 90/6/4 | 17.3 | 378 | 567 | 51.87 |
| 80/15/5 | 16.7 | 394 | 482 | 115 |
| 70/25/5 | 17.7 | 461 | 477 | 431 |

As shown in Table 1, both pure XLPE and XLPE/PP/Talc 90/6/4 composite have substantially the same crosslink density. The crosslink density increases substantially with increasing concentration of PP considering the talc concentration was kept substantially constant at approximately 5 wt %. For example, consider that the crosslink density of XLPE/PP/Talc 80/15/5 increases from about 115 mol/m³ to about 431 mol/m³ for XLPE/PP/Talc 70/25/5. The mechanical properties of the fully cured samples are also demonstrated in Table 1. No substantial change was observed in the stress at break by adding PP and talc to the XLPE. However, on the other hand, the modulus considerably increased and the strain decreased by adding PP and talc. As shown in Table 1, acceptable mechanical properties of fully cured XLPE changed just slightly by adding PP and talc.

As an example, a power cable for use with an electric submersible pumping system can include a conductor, an insulation layer over the conductor, a barrier layer atop the insulation layer, and a protective layer that includes XLPE over the barrier layer. An electric submersible pumping system can include an electric submersible pump that receives electricity from an electric power source by way of a power cable connected there between, the power cable including a protective layer that includes XLPE over a lead (Pb) barrier layer.

As an example, a power cable for use with an electric submersible pumping system can include a conductor; an insulation layer disposed on an outer surface of the conductor; a barrier layer disposed on an outer surface of the insulation layer; and a protective layer disposed on an outer surface of the barrier layer. In such an example, the protective layer can be a cushion layer that can be an extruded cushion layer that includes XLPE and optionally one or more additional materials (e.g., PP, talc, carbon black, etc.).

As an example, a power cable can include an insulation layer that includes EPDM, a lead (Pb) barrier layer and a protective layer that includes a crosslinked polyethylene where the protective layer may further include polypropylene and/or talc. Such a power cable can include an armor layer about an outer surface of the protective layer.

As an example, an electric submersible pumping system can include an electric submersible pump that includes an electric motor and a pump; an electric power source for providing electricity; and a power cable disposed between the electric power source and the electric motor for supplying electricity from the power source to the electric motor, where the power cable includes a protective layer extruded on an outer surface of a lead (Pb) barrier layer. In such an example, the protective layer can include XLPE that has been extruded to form a solid XLPE layer about the lead (Pb) barrier layer.

As an example, an extrudable material can include crosslinkable polyethylene and polypropylene and/or talc. Such an extrudable material may be formulated to have desired properties upon extrusion and before substantial crosslinking of the polyethylene. In such an example, the additives may impart properties that facilitate manufacturing of a cable (e.g., or an assembly for a cable) before a desired amount of polyethylene crosslink has occurred post-extrusion.

Figure 23:
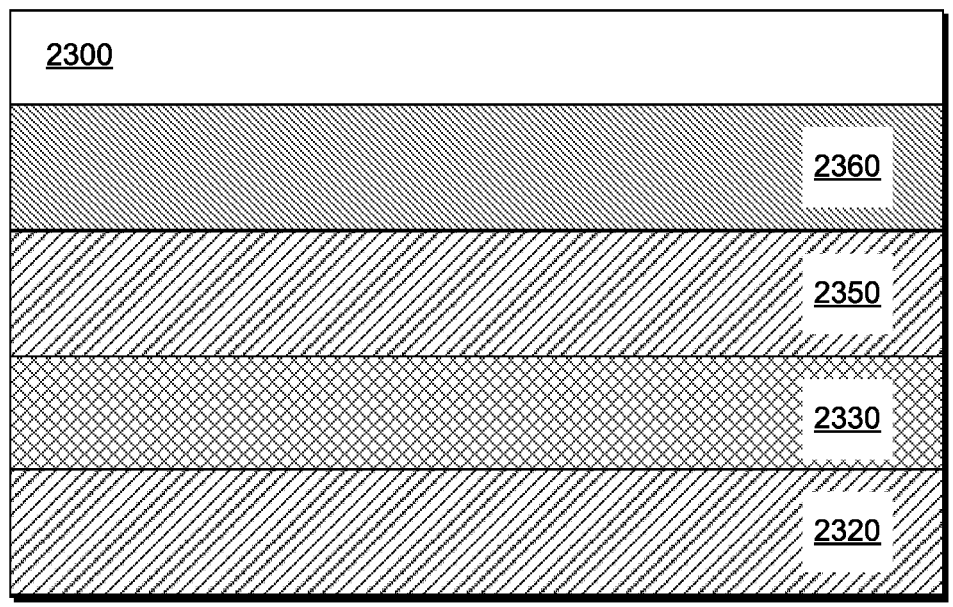
FIG. 23 illustrates an example of a portion of an insulated conductor with a shield and a cushion layer.
Figure 23:
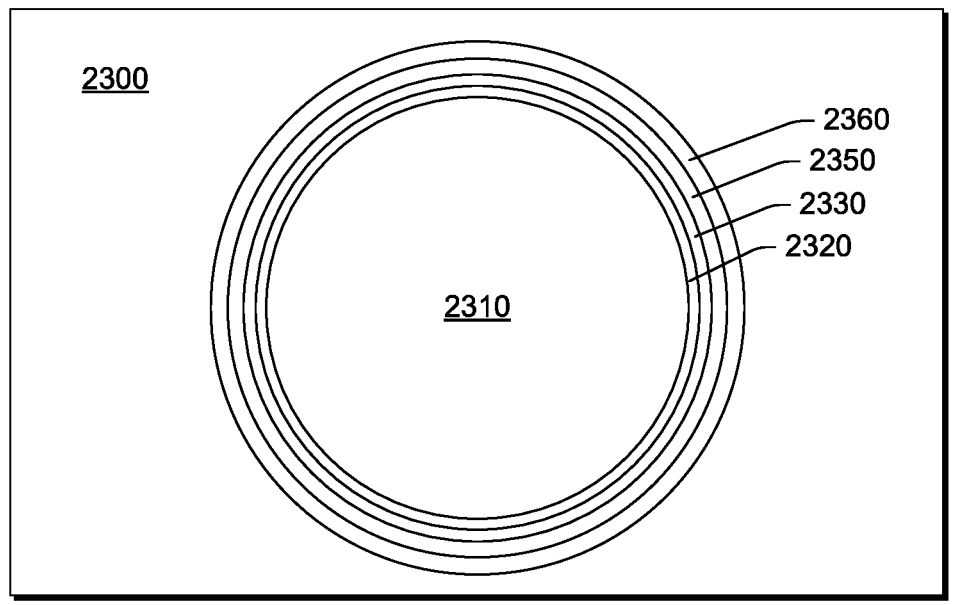

FIG. 23 shows a portion of a power cable 2300 that includes one or more conductors 2310 and layers 2320, 2330, 2350 and 2360.

In the example of FIG. 23, the one or more conductors 2310 may be formed from a raw conductor material (e.g., copper) that has been drawn to a standard wire size, annealed, and plated in either a stranded or solid configuration. A material may form the layer 2320, which may be optional, about the conductor or conductors 2310, which may be a treatment material. As shown in FIG. 23, the one or more conductors 2310 is(are) insulated with an insulation layer 2330 such as a layer that includes EPDM. As shown in FIG. 23, the layer 2350 may be, for example, a lead (Pb) barrier layer. The layer 2350 may be applied over each insulation layer 2330 depending on a configuration of conductors in a cable. The layer 2360 can be a cushion layer that includes a crosslinked polymeric material such as crosslinked polyethylene (XPLE). The layer 2360 may include one or more of polypropylene (PP) and talc.

In some round cable embodiments, two or more individual coated conductors can be twisted together before armor is applied. In some round cable embodiments, a plurality of individual coated conductors can be braided together before armor is applied. In some round cable embodiments, a power cable includes three conductors.

In some embodiments, a power cable may include one or more conductors, an EPDM insulation layer disposed over each conductor, and a lead (Pb) barrier layer disposed over the EPDM insulated conductor(s). In such an example, a cushion layer of material that includes polyethylene can be extruded over the lead (Pb) barrier layer where the polyethylene can be crosslinked to form XLPE. An armor layer may be applied over the cushion layer, directly or indirectly. Such an armor layer may be a metallic armor that is wound spirally about one or more assemblies (e.g., conductor assemblies).

A round power cable may be used as power cable in an electric submersible pumping system.

In some flat power cable embodiments, two or more individual coated conductors can be arranged in a side-by-side configuration (e.g., a 2×1, 3×1, or 4×1 configuration) and an armor layer can be applied over a jacket. In some embodiments, a flat power cable may include one or more conductors, an insulation layer disposed over each conductor, a lead (Pb) barrier layer disposed over each insulation layer, a cushion layer of crosslinked polyethylene (XPLE) that can include one or more additives that may be included in an extrudate that includes polyethylene, and an armor layer.

A flat power cable may be used as a power cable in an electric submersible pumping system.

As an example, a cable may be a medium voltage power cable for an application where lead sheathed cables can be utilized and where high temperature exposure or high cable reliability is desired. As an example, a cable may be free of or relatively free of dielectric materials such as, for example, fluoroplastics and/or PEEK.

Figure 24:
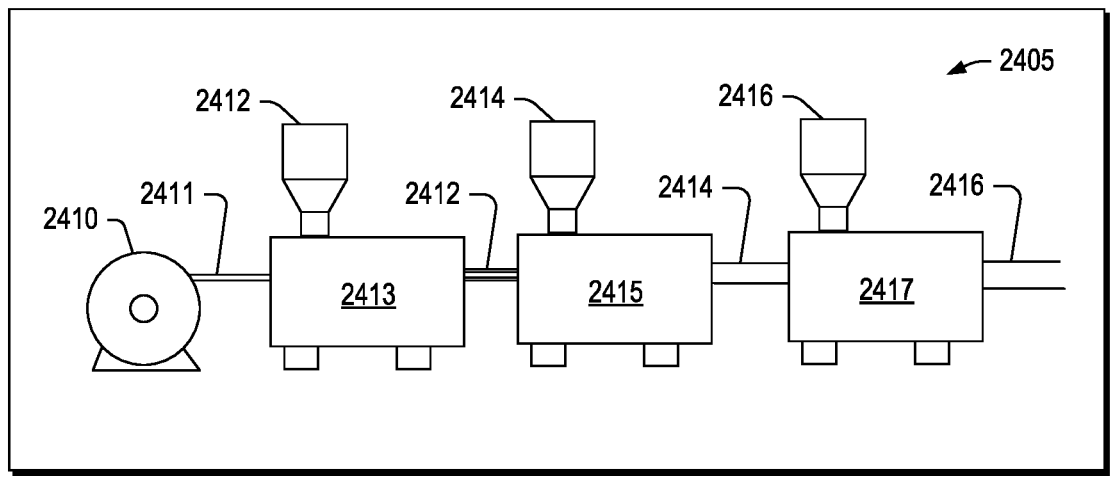
FIG. 24 illustrates examples of processing equipment.

FIG. 24 shows an example of processing equipment 2405 that can include a reel 2410 that carries a conductor 2411 for translation to a first extruder 2413 fed with a first material 2412 that can be extruded about the conductor 2411 and then translated to a second extruder 2415 fed with a second material 2414 that can be extruded about the first material 2412 and then translated to a third extruder 2417 fed with a third material 2416 that can be extruded about the second material 2414.

As an example, the processing equipment 2405 can deposit insulation as the first material 2412 and can deposit a lead (Pb) barrier material as the second material 2414. The third material 2416 can include polyethylene optionally mixed with polypropylene and/or talc. The third material 2416 can form a cushion layer about the second material 2414. The third material 2416 can have a hoop stress such that it helps to retain shape, which may, in turn, help to retain shape of the second material 2414. The third material 2416 can be formulated for at least some amount of crosslinking after extrusion by the extruder 2417. As an example, crosslinking can occur at least in part in situ while the assembly formed via the extruder 2417 is waiting to be armored and/or otherwise processed. Such crosslinking may occur, for example, in an environment at ambient conditions (e.g., room temperature, outdoor temperature, etc.). As an example, some amount of crosslinking may occur during transportation and/or during deployment of a cable that includes at least one assembly such as an assembly that exits the extruder 2417.

As an example, processing equipment may optionally include one or more types of equipment that can be used to alter properties of the first material 2412 and/or the second material 2414 and/or the third material 2416. For example, such equipment can be or include a hot air oven and/or a hot liquid bath that can expedite curing, post-curing, etc. when one or more of the materials 2412 and 2416 is passed therethrough.

As an example, a polymeric material can be an ethylene propylene diene monomer (M-class) rubber (EPDM). EPDM rubber is a terpolymer of ethylene, propylene, and a diene-component. As an example, ethylene content may be, for example, from about 40 percent to about 90 percent where, within such a range, a higher ethylene content may be beneficial for extrusion. Such a polymeric material can be utilized for insulating one or more conductors.

As an example, a polymeric material can be a polyethylene material that is capable of being crosslinked to a desired extent, which can include a full cured extent. Such a polymeric material may be mixed with one or more other materials such as, for example, polypropylene (PP) and/or talc.

As an example, a method can include extruding polyethylene about a lead (Pb) barrier layer disposed about a conductor to form an assembly; and armoring at least one of the assemblies with metallic armor to form a cable. In such an example, extruding polyethylene can include extruding talc mixed with the polyethylene and/or extruding polypropylene mixed with the polyethylene.

As an example, a method can include crosslinking at least a portion of polyethylene after armoring and/or crosslinking at least a portion of the polyethylene before armoring. As to crosslinking, a process can include controlling one or more parameters to achieve a desired crosslinking rate and/or a desired crosslink density of a material that includes polyethylene and optionally one or more of talc and polypropylene.

As an example, a method can include extruding polyethylene that is or that includes low density polyethylene (LDPE). As an example, a method can include extruding polyethylene that is or that includes high density polyethylene (HDPE). As an example, a method can include extruding polyethylene that includes low density polyethylene (LDPE) and high density polyethylene (HDPE).

As an example, a method can include extruding polyethylene about a lead (Pb) barrier layer disposed about a conductor to form an assembly; and armoring at least one of the assemblies with metallic armor to form a cable where armoring includes wrapping the metallic armor directly over the extruded polyethylene. In such an example, at least a portion of the metallic armor can directly contact the extruded polyethylene.

As an example, a method can include extruding polyethylene about a lead (Pb) barrier layer disposed about a conductor to form an assembly; armoring at least one of the assemblies with metallic armor to form a cable; and operatively coupling the cable to a submersible electrical motor. In such an example, the method can include submersing the submersible electrical motor and powering the submersed electrical motor via electrical power supplied to the cable. Such a cable can be referred to as a power cable.

As an example, a power cable can include a conductor; a lead (Pb) barrier layer disposed about the conductor; a cushion layer disposed about the lead (Pb) barrier layer where the cushion layer includes crosslinked polyethylene (XLPE); and metallic armor wrapped about the cushion layer. In such an example, the cushion layer can include polypropylene and/or clay. In such an example, the clay can be or include talc. As an example, a cushion layer can include one or more colorants. For example, a multiphase power cable can include color coded cushion layers where a different color can code each phase of the multiphase power cable. As an example, a cushion layer can include carbon black.

As an example, in a power cable, a conductor, a lead (Pb) barrier layer and a cushion layer can form an assembly where power cable is a multiple phase power cable that includes a plurality of the assemblies wrapped by metallic armor.

As an example, a power cable can include a conductor; a lead (Pb) barrier layer disposed about the conductor; a cushion layer disposed about the lead (Pb) barrier layer where the cushion layer includes crosslinked polyethylene (XLPE); and metallic armor wrapped about the cushion layer where the power cable is a multiphase, electrical submersible pump power cable.

As an example, a pump system can include a pump; a submersible electric motor operatively coupled to the pump; and a power cable for delivery of electrical power to the submersible electric motor, where the power cable includes a conductor, a lead (Pb) barrier layer disposed about the conductor, a cushion layer disposed about the lead (Pb) barrier layer where the cushion layer includes crosslinked polyethylene (XLPE), and metallic armor wrapped about the cushion layer. In such an example, the cushion layer can include clay and/or polypropylene. In such an example, the clay can be or include talc.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an application process, an extrusion process, a curing process, a tape forming process, a pumping process, a heating process, etc.

Figure 25:
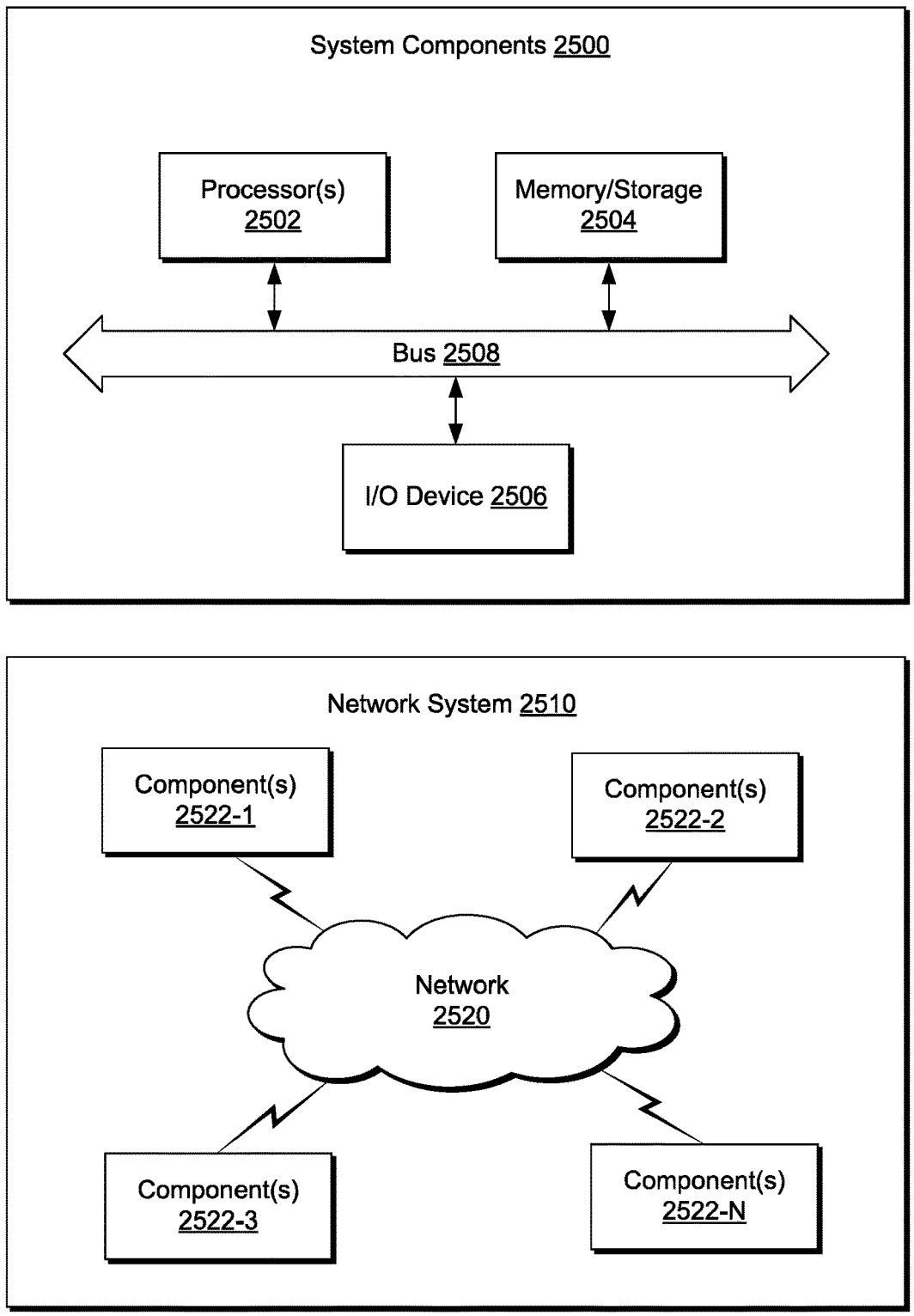
FIG. 25 illustrates example components of a system and a networked system.

FIG. 25 shows components of a computing system 2500 and a networked system 2510. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A flat electric submersible pump power cable comprising:
three conductor assemblies that comprise a length in excess of 100 meters, an end conductor assembly that contacts a middle conductor assembly that contacts another end conductor assembly, wherein each of the conductor assemblies comprises a conductor, an annular dielectric insulation layer disposed about the conductor, an annular electrical ground plane and gas barrier layer of lead (Pb) disposed about the annular dielectric insulation layer and an extruded annular cushion layer that comprises an annular shape and a material that comprises crosslinked polyethylene (XLPE), crosslinked using an alternative to organic peroxide to avoid peroxide associated radical polymerization generated decomposition products, disposed about the annular electrical ground plane and gas barrier layer of lead (Pb), wherein the annular electrical ground plane and gas barrier layer of lead (Pb) comprises an annular shape; and a helically wrapped metallic armor layer disposed around the three conductor assemblies, wherein the material of the extruded annular cushion layer comprises a material storage modulus equal to or greater than 289 MPa at 50 degrees C. and an annular hoop strength, wherein the material storage modulus characterizes deformability of the material that cushions the annular electrical ground plane and gas barrier layer of lead (Pb) from deformation responsive to wrapping force of the helically wrapped armor layer to reduce risk of indentations in the annular electrical ground plane and gas barrier layer of lead (Pb), and wherein the annular hoop strength characterizes resistance to compressive deformation of the annular shape of the annular cushion layer that shields the annular shape of the annular electrical ground plane and gas barrier layer of lead (Pb) from deformation responsive to the wrapping force of the helically wrapped armor layer to reduce risk of bulging of the flat electrical submersible pump power cable.

2. The flat electric submersible pump power cable of claim 1 wherein the annular extruded cushion layer further comprises polypropylene, clay or polypropylene and clay to increase the storage modulus.

3. The flat electric submersible pump power cable of claim 1 wherein the annular extruded cushion layer comprises high density polyethylene.

4. The flat electric submersible pump power cable of claim 1 wherein the annular extruded cushion layer comprises a mixture of polyethylenes of different densities.

5. The flat electric submersible pump power cable of claim 1 wherein the annular extruded cushion layer further comprises carbon black.

6. The flat electric submersible pump power cable of claim 1 wherein the three conductor assemblies form a multiphase electrical power assembly.

7. The flat electric submersible pump power cable of claim 1 wherein the annular extruded cushion layer comprises talc.

8. The flat electric submersible pump power cable of claim 7, wherein the talc increases the material storage modulus.

9. An electric submersible pump system comprising:
an electric submersible pump that comprises an electric motor; and
a flat electric submersible pump power cable that comprises:
three conductor assemblies that comprise a length in excess of 100 meters, an end conductor assembly that contacts a middle conductor assembly that contacts another end conductor assembly, wherein each of the conductor assemblies comprises a conductor, an annular dielectric insulation layer disposed about the conductor, an annular electrical ground plane and gas barrier layer of lead (Pb) disposed about the annular dielectric insulation layer and an extruded annular cushion layer that comprises an annular shape and a material that comprises crosslinked polyethylene (XLPE), crosslinked using an alternative to organic peroxide to avoid peroxide associated radical polymerization generated decomposition products, disposed about the annular electrical ground plane and gas barrier layer of lead (Pb), wherein the annular electrical ground plane and gas barrier layer of lead (Pb) comprises an annular shape; and
a helically wrapped metallic armor layer disposed around the three conductor assemblies, wherein the material of the extruded annular cushion layer comprises a material storage modulus equal to or greater than 289 MPa at 50 degrees C. and an annular hoop strength, wherein the material storage modulus characterizes deformability of the material that cushions the annular electrical ground plane and gas barrier layer of lead (Pb) from deformation responsive to wrapping force of the helically wrapped armor layer to reduce risk of indentations in the annular electrical ground plane and gas barrier layer of lead (Pb), and wherein the annular hoop strength characterizes resistance to compressive deformation of the annular shape of the annular cushion layer that shields the annular shape of the annular electrical ground plane and gas barrier layer of lead (Pb) from deformation responsive to the wrapping force of the helically wrapped armor layer to reduce risk of bulging of the flat electrical submersible pump power cable.

10. The electric submersible pump system of claim 9 wherein the annular extruded cushion layer further comprises polypropylene, clay or polypropylene and clay to increase the storage modulus.

11. The electric submersible pump system of claim 9 wherein the annular extruded cushion layer comprises talc.

12. The electric submersible pump system of claim 11 wherein the talc increases the material storage modulus.

* * * * *